United States Patent
Elangovan et al.

(10) Patent No.: US 9,473,748 B2
(45) Date of Patent: Oct. 18, 2016

(54) VIDEO TRACKING OF BASEBALL PLAYERS TO DETERMINE THE END OF A HALF-INNING

(71) Applicant: Sportvision, Inc., Chicago, IL (US)

(72) Inventors: Vidya Elangovan, Saratoga, CA (US); Marlena Fecho, La Jolla, CA (US); Timothy P Heidmann, Los Altos, CA (US)

(73) Assignee: Sportvision, Inc., Chicago, IL (US)

( * ) Notice: Subject to any disclaimer, the term of this patent is extended or adjusted under 35 U.S.C. 154(b) by 346 days.

(21) Appl. No.: 14/151,440

(22) Filed: Jan. 9, 2014

(65) Prior Publication Data

US 2014/0125807 A1 May 8, 2014

Related U.S. Application Data

(62) Division of application No. 12/976,766, filed on Dec. 22, 2010, now Pat. No. 8,659,663.

(51) Int. Cl.
*H04N 7/18* (2006.01)
*G06T 7/20* (2006.01)
*G06K 9/00* (2006.01)

(52) U.S. Cl.
CPC ............. *H04N 7/181* (2013.01); *G06T 7/20* (2013.01); *G06K 2009/00738* (2013.01); *G06T 2207/30196* (2013.01); *G06T 2207/30224* (2013.01); *G06T 2207/30241* (2013.01)

(58) Field of Classification Search
None
See application file for complete search history.

(56) References Cited

U.S. PATENT DOCUMENTS 5,742,521 A * 4/1998 Ellenby ................. G01C 17/34
702/127
5,808,695 A 9/1998 Rosser et al.
(Continued)

OTHER PUBLICATIONS

Bebie, Thomas, et al., "SoccerMan-Reconstructing Soccer Games from Video Sequences," Institute of Computer Science and Applied Mathematics, 1998 IEEE, pp. 898-902.

(Continued)

*Primary Examiner* — Geepy Pe
(74) *Attorney, Agent, or Firm* — Vierra Magen Marcus LLP

(57) ABSTRACT

Video frames of a baseball game are analyzed to determine a track for the participants in the game, e.g., players, coaches and umpires, and to update a digital record of the game. The start and/or end of a half-inning can be indicated by factors such as: the participants leaving the dugout region and entering the playing field, including the outfield, a participant leaving the dugout region and entering the region of a base coach's box, a pitcher throwing pitches when no batter is present, and players on the playing field throwing the ball back and forth to one another. In one approach, the combination of detecting an event which is known to occur most often or always between half-innings followed by detecting another event which is known to occur most often or always during a half-inning, can be used to signal that a half-inning has started.

17 Claims, 31 Drawing Sheets

(56) References Cited

U.S. PATENT DOCUMENTS

| | | | |
|---|---|---|---|
| 5,912,700 | A | 6/1999 | Honey et al. |
| 6,133,946 | A | 10/2000 | Cavallaro et al. |
| 6,441,846 | B1 | 8/2002 | Carlborn et al. |
| 6,529,613 | B1 | 3/2003 | Astle |
| 7,143,354 | B2 | 11/2006 | Li et al. |
| 7,231,088 | B2 | 6/2007 | Echigo et al. |
| 2001/0031067 | A1 | 10/2001 | Kennedy, Jr. et al. |
| 2002/0018594 | A1 | 2/2002 | Xu et al. |
| 2003/0049590 | A1 | 3/2003 | Feldbau |
| 2005/0159956 | A1 | 7/2005 | Rui et al. |
| 2008/0068463 | A1 | 3/2008 | Claveau et al. |
| 2008/0192116 | A1 | 8/2008 | Tamir et al. |
| 2008/0199043 | A1 | 8/2008 | Forsgren |
| 2008/0291272 | A1 | 11/2008 | Krahnstoever et al. |
| 2009/0046152 | A1 | 2/2009 | Aman |
| 2009/0257649 | A1 | 10/2009 | Yamauchi et al. |
| 2009/0303343 | A1 | 12/2009 | Drimbarean et al. |
| 2012/0162435 | A1 | 6/2012 | Elangovan et al. |

OTHER PUBLICATIONS

Chang, Peng, et al., "Extract Highlights From Baseball Game Video With Hidden Markov Models," 2002 International Conference on Image Processing, Dec. 2002, 4 pages.

Chen, Hua-Tsung, et al., "A Trajectory-Based Ball Tracking Framework with Visual Enrichment for Broadcast Baseball Video," Journal of Information Science and Engineering 24, 2008, pp. 143-157.

Chu, Wei-Ta, et al., "Explicit semantic events detection and development of realistic applications for broadcasting baseball videos," Multimed Tools Appl, Jun. 29, 2007, pp. 27-50.

Desa, Shahbe Mat, et al., "Image Subtraction for Real Time Moving Object Extraction," Proceedings of the International Conference on Computer Graphics, Imaging and Visualization, Jul. 2004, 5 pages.

Dimitrova, Nevenka, et al., "Applications of Video-Content Analysis and Retrieval," Multimedia IEEE, Jul.-Sep. 2002, pp. 42-55.

Duan, Ling-Yu, et al., "A Unified Framework for Semantic Shot Classification in Sports Video," IEEE Transactions on Multimedia, vol. 7, No. 6, Dec. 2005, pp. 1066-1083.

Fleischman, Michael, et al., "Temporal Feature Induction for Baseball Highlight Classification," ACM MM, Oct. 2007, Augsberg, Germany, 4 pages.

Gong, Yihong, et al., "Automatic Parsing of TV Soccer Programs," Proceedings of the International Conference on Multimedia Computing and Systems, May 1995, pp. 167-174.

Haritaoglu, I., et al., "Hydra: Multiple People Detection and Tracking Using Silhouettes," Visual Surveillance, 1999, Second IEEE Workshop on Video Surveillance, (VS'99), Jul. 1999, 4 pages.

Huang, Yu, et al., "Players and Ball Detection in Soccer Videos Based on Color Segmentation and Shape Analysis," Thomson Corporate Research, MCAM 2007, LNCS 4577, pp. 416-425.

Huang, Kaiqi, et al., "A real-time object detecting and tracking system for outdoor night surveillance," Pattern Recognition 41, 2008, pp. 432-444.

Kawashima, Toshio, et al., "Indexing of Baseball Telecast for Content-based Video Retrieval," 1998 International Conference on Image Processing, Oct. 1998, pp. 871-874.

Lehuger, A., et al., "A robust method for automatic player detection in sport videos," Orange Labs, 4 rue do clos courtel, 35512 Cesson-Sevigne, CORESA, Nov. 2007, 6 pages.

Liu, Jia, et al., "Automatic Player Detection, Labeling and Tracking in Broadcast Soccer Video," Pattern Recognition Letters, vol. 30, Issue 2, Jan. 2009, 10 pages.

McHugh, J. Mike, et al., "Foreground-Adaptive Background Subtraction," IEEE Signal Processing Letters, vol. 16, Issue 5, May 2009, pp. 1-4.

"PITCHfx, HITfx, FIELDfx—BASEBALLfx," Sport-vision Baseball Summit, Jul. 14, 2009, 7 pages.

Rick Swanson, "Reaction over Range—Using time over distance in measuring baseball defense," Sportvision Baseball Summit, Jul. 14, 2009, 11 pages.

Rui, Yong, et al., "Automatically Extracting Highlights for TV Baseball Programs," Microsoft Research, Proceedings of the 8th ACM International Conference on Multimedia, 2000, 11 pages.

Rybarczyk, Greg, "Baseball Fx: Architecture for the Ultimate Virtual Gamecast," Sportvision Baseball Summit, Jul. 15, 2009, 23 pages.

Sadlier, David A., "Event Detection in Field Sports Video Using Audio-Visual Features and a Support Vector Machine," IEEE Transaction on Circuits and Systems for Video Technology, vol. 15, No. 10, Oct. 2005, pp. 1225-1233.

Trucco, E., et al., "Camera Calibration", Introductory Techniques for 3-D Computer Vision, Chapter 6, Prentice Hall, 1998, pp. 1-13.

Yacoob, Yaser, "Parameterized Modeling and Recognition of Activities," Sixth International Conference on Computer Vision, Jan. 1998, pp. 120-127.

Zhang, Dongqing, "Event Detection in Baseball Video Using Superimposed Caption Recognition," Proceedings on the 10th ACM International Conference on Multimedia, 2002, 4 pages.

Zhong, Di, et al., "Structure Analysis of Sports Video Using Domain Models," IEEE International Conference on Multimedia and Expo, Aug. 2001, 4 pages.

Zhu, Guangyu, "Action Recognition in Broadcast Tennis Video Using Optical Flow and Support Vector Machine," 18th International Conference on Pattern Recognition, Sep. 2006, pp. 89-98.

Restriction Requirement dated Jun. 11, 2013, U.S. Appl. No. 12/976,766, filed Dec. 22, 2010.

Response to Restriction Requirement dated Jun. 11, 2013, U.S. Appl. No. 12/976,766, filed Dec. 22, 2010.

Pei, Soo-Chang et al., "Semantic Scenes Detection and Classification in Sports Videos," 16th IPPR Conference on Computer Vision, Graphics and Image Processing (CVGIP 2003), 2003, 8 pgs.

Non-final Office Action dated Jul. 12, 2013, U.S. Appl. No. 12/976,766, filed Dec. 22, 2010.

Response to Office Action dated Oct. 14, 2013, U.S. Appl. No. 12/976,766, filed Dec. 22, 2010.

Notice of Allowance dated Nov. 4, 2013, U.S. Appl. No. 12/976,766, filed Dec. 22, 2010.

* cited by examiner

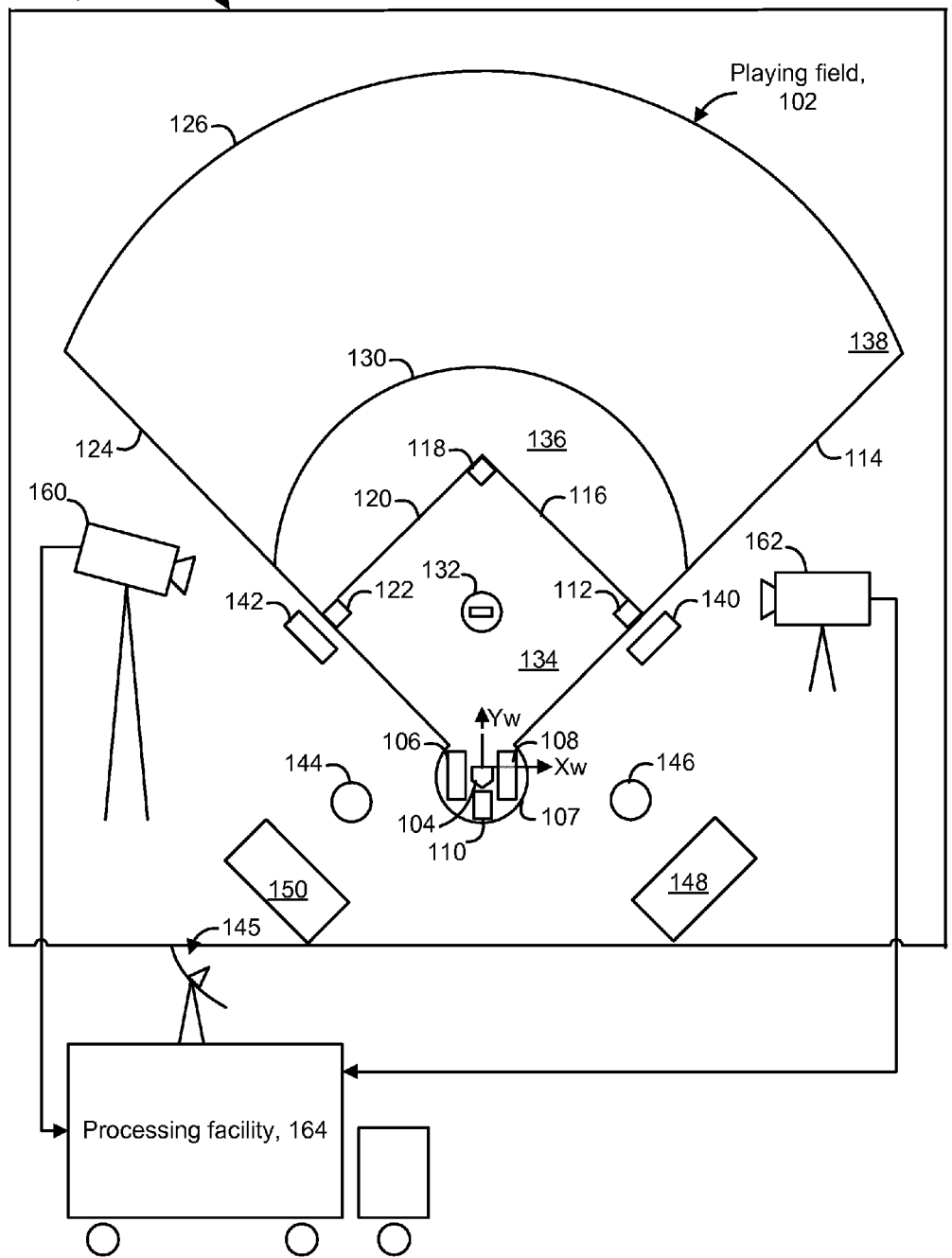

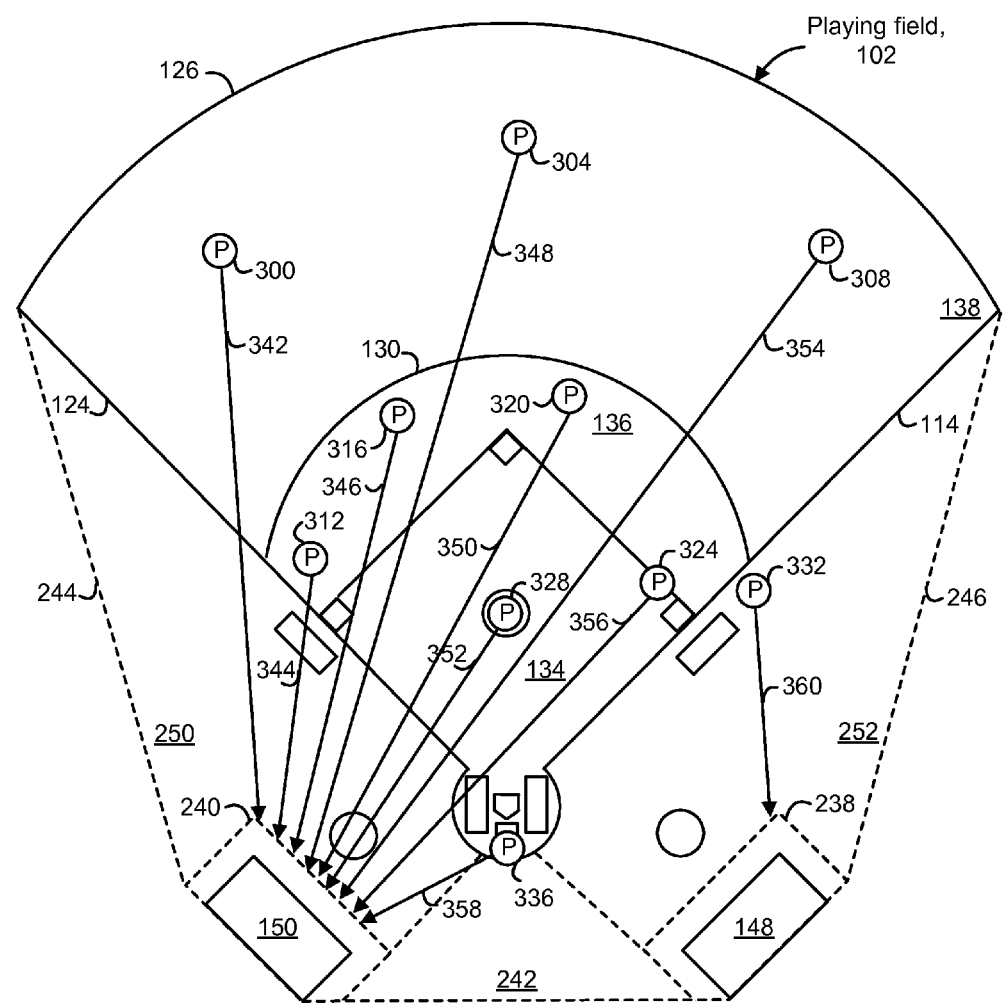
Fig. 3B1

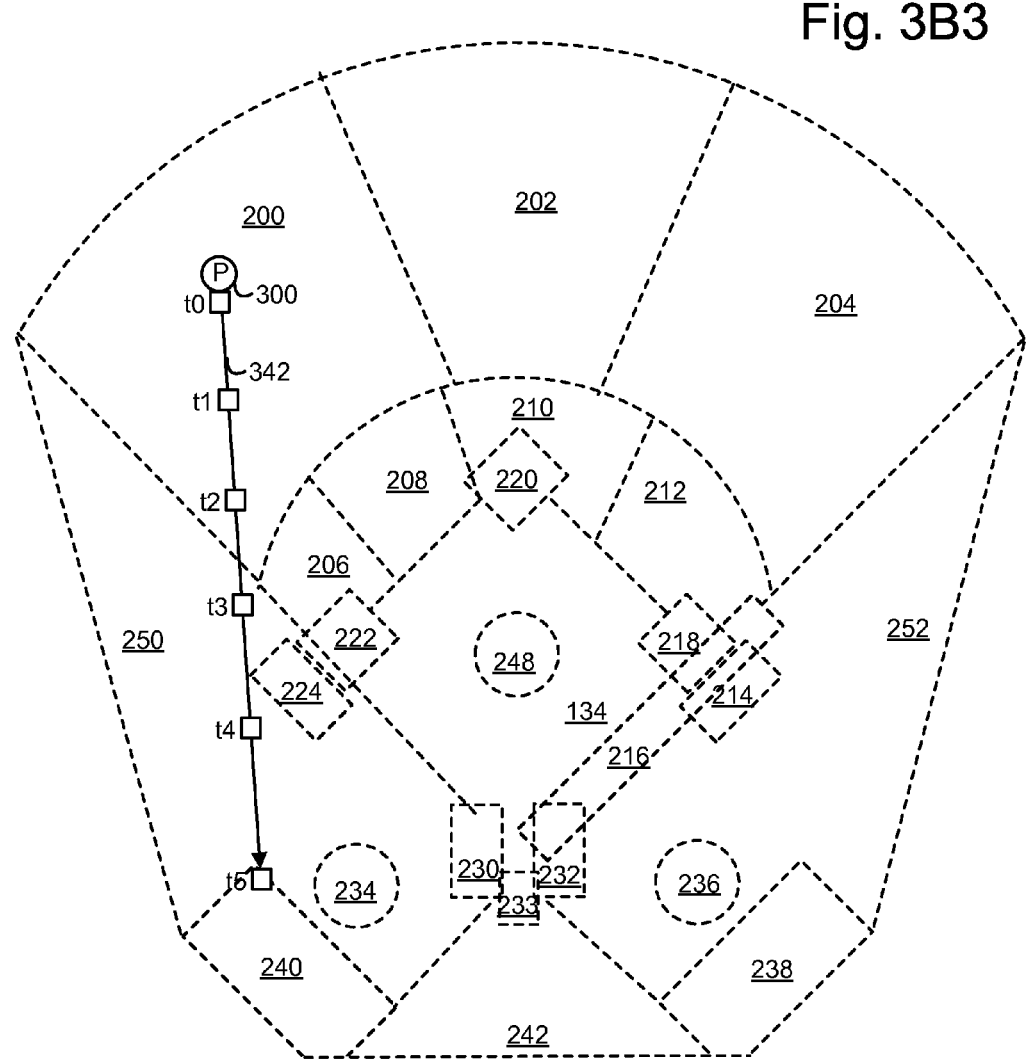
Digital record for left fielder
| time | location (Xw,Yw) | region |
|---|---|---|
| t0 | -51,91 | 200 |
| t1 | -49,75 | 200 |
| t2 | -48,60 | 200 |
| t3 | -47,40 | 250 |
| t4 | -46,20 | 250 |
| t5 | -44,-5 | 240 |
Fig. 3B2
Fig. 3B3

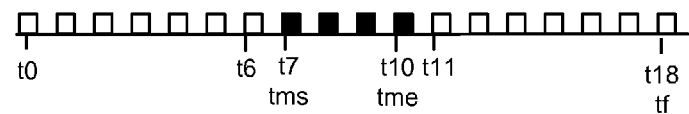
Fig. 5E1
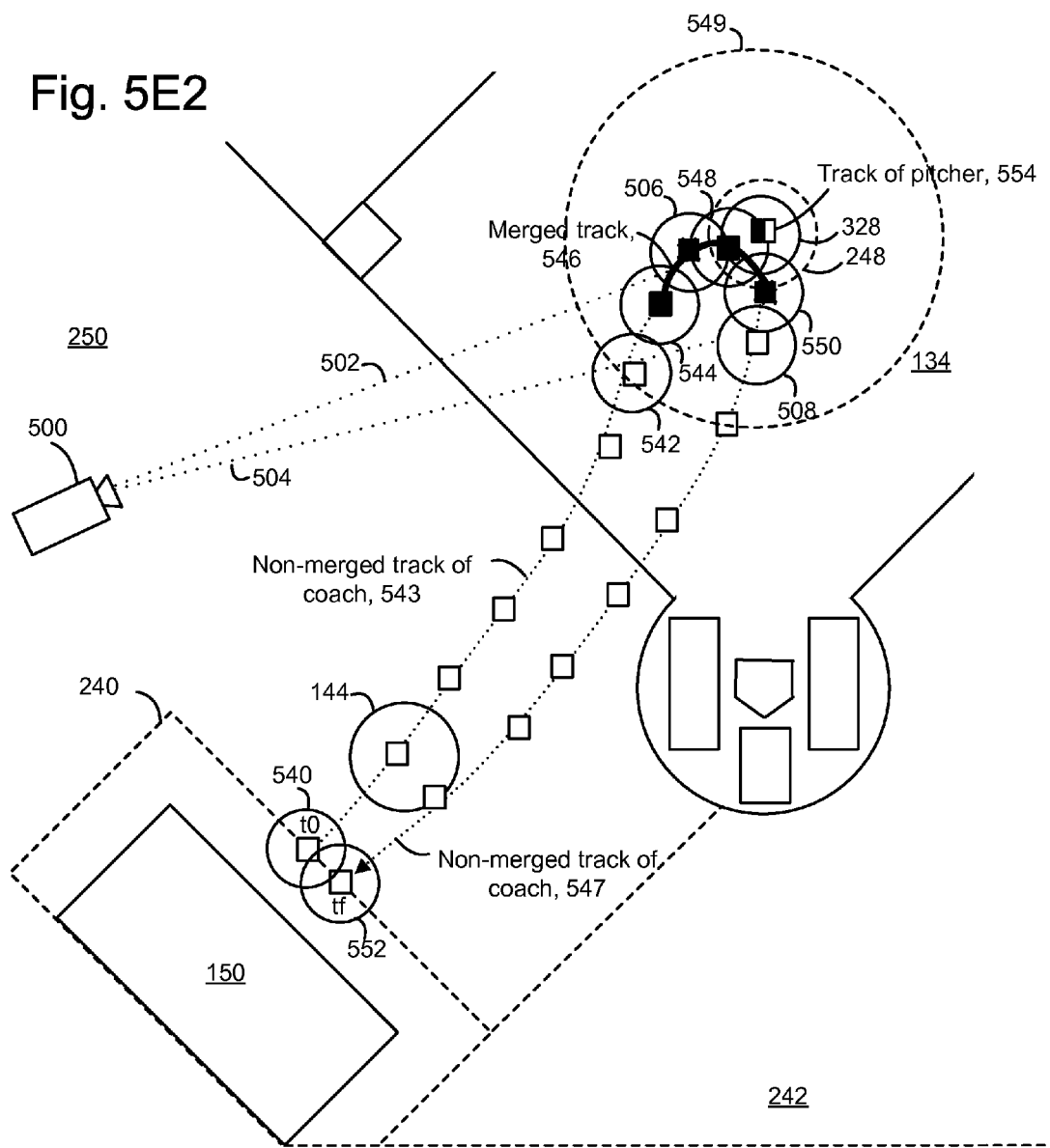
Fig. 5E2

Fig. 5E3

Digital record for pitcher, camera 500

| time | location (Xw,Yw) | region | merged track? | merge resolved? | resolved by: | merged with: |
|---|---|---|---|---|---|---|
| t0 | -1,31 | 248 | n | | | |
| t1 | -1,31 | 248 | n | | | |
| t2 | -1,31 | 248 | n | | | |
| t3 | -1,31 | 248 | n | | | |
| t4 | -1,31 | 248 | n | | | |
| t5 | -1,31 | 248 | n | | | |
| t6 | -1,31 | 248 | n | | | |
| t7/tms | -1,31 | 248 | y | y | t11-t18 | coach |
| t8 | -1,31 | 248 | y | y | t11-t18 | coach |
| t9 | -1,31 | 248 | y | y | t11-t18 | coach |
| t10/tme | -1,31 | 248 | y | y | t11-t18 | coach |
| t11 | -1,31 | 248 | n | | | |
| t12 | -1,31 | 248 | n | | | |
| t13 | -1,31 | 248 | n | | | |
| t14 | -1,31 | 248 | n | | | |
| t15 | -1,31 | 248 | n | | | |
| t16 | -1,31 | 248 | n | | | |
| t17 | -1,31 | 248 | n | | | |
| t18 | -1,31 | 248 | n | | | |

Fig. 5E4

Digital record for coach, camera 500

| time | location (Xw,Yw) | region | merged track? | merge resolved? | resolved by: | merged with: |
|---|---|---|---|---|---|---|
| t0 | -33,-12 | 240 | n | | | |
| t1 | -27,-6 | 250 | n | | | |
| t2 | -58,0 | 250 | n | | | |
| t3 | -19,4 | 250 | n | | | |
| t4 | -16,10 | 250 | n | | | |
| t5 | -12,16 | 134 | n | | | |
| t6 | -10,20 | 134 | n | | | |
| t7/tms | -8,26 | 134 | y | y | t11-t18 | pitcher |
| t8 | -6,32 | 134 | y | y | t11-t18 | pitcher |
| t9 | -3,31 | 248 | y | y | t11-t18 | pitcher |
| t10/tme | -1,28 | 248 | y | y | t11-t18 | pitcher |
| t11 | -1,24 | 134 | n | | | |
| t12 | -3,16 | 134 | n | | | |
| t13 | -8,12 | 134 | n | | | |
| t14 | -12,6 | 250 | n | | | |
| t15 | -24,1 | 250 | n | | | |
| t16 | -17,-4 | 250 | n | | | |
| t17 | -24,-8 | 250 | n | | | |
| t18 | -31,-16 | 240 | n | | | |

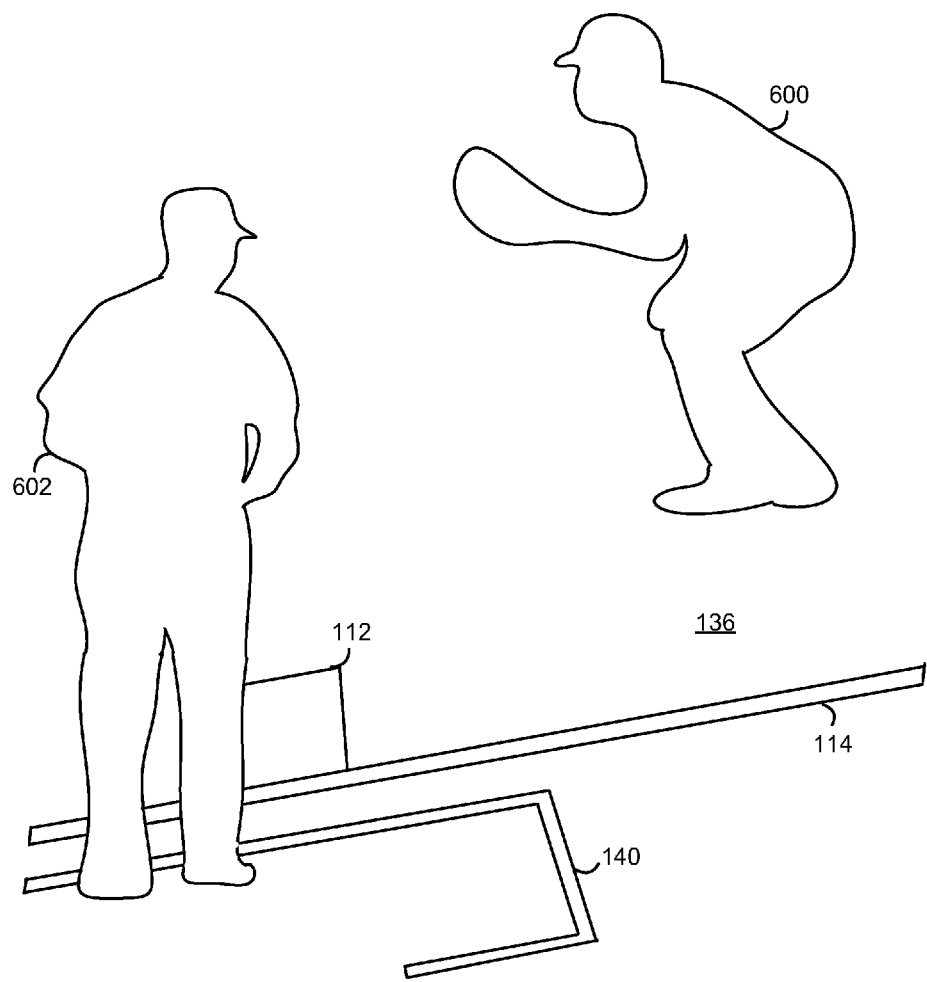

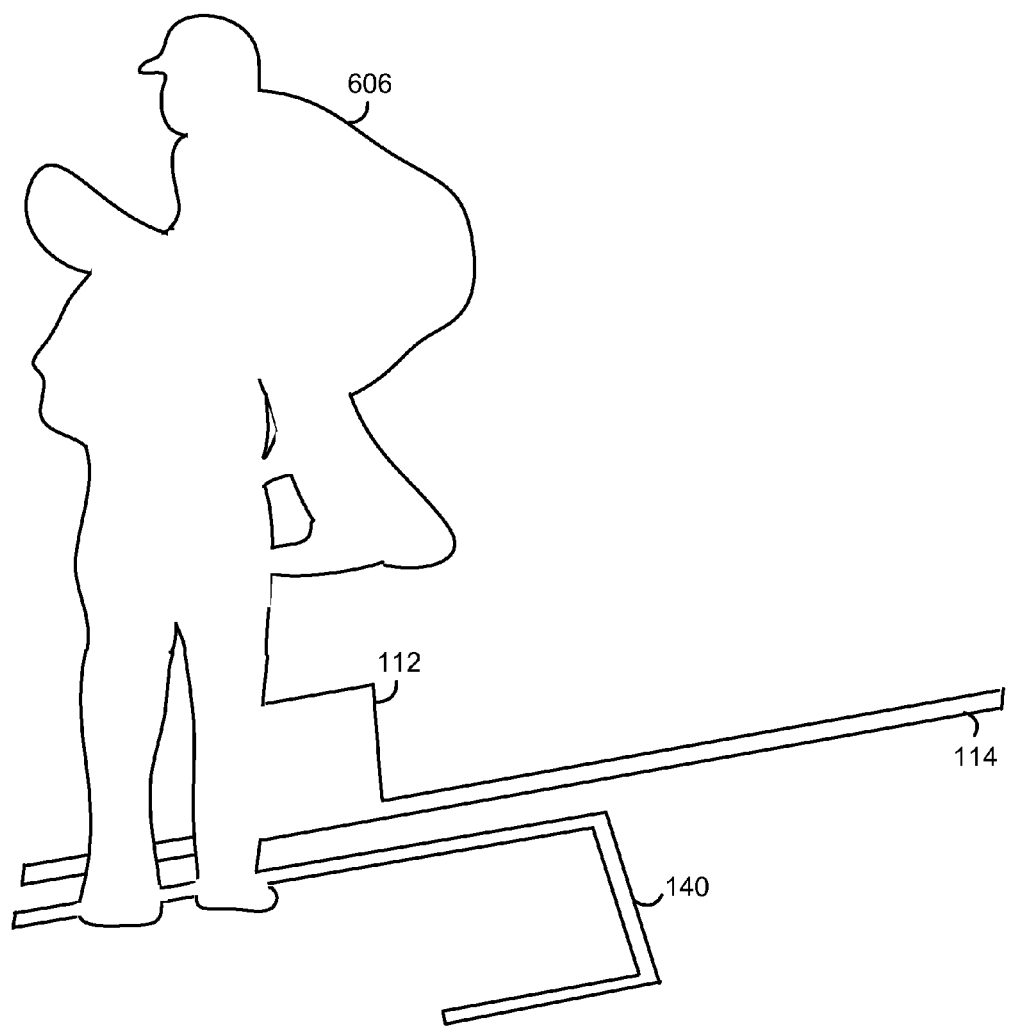

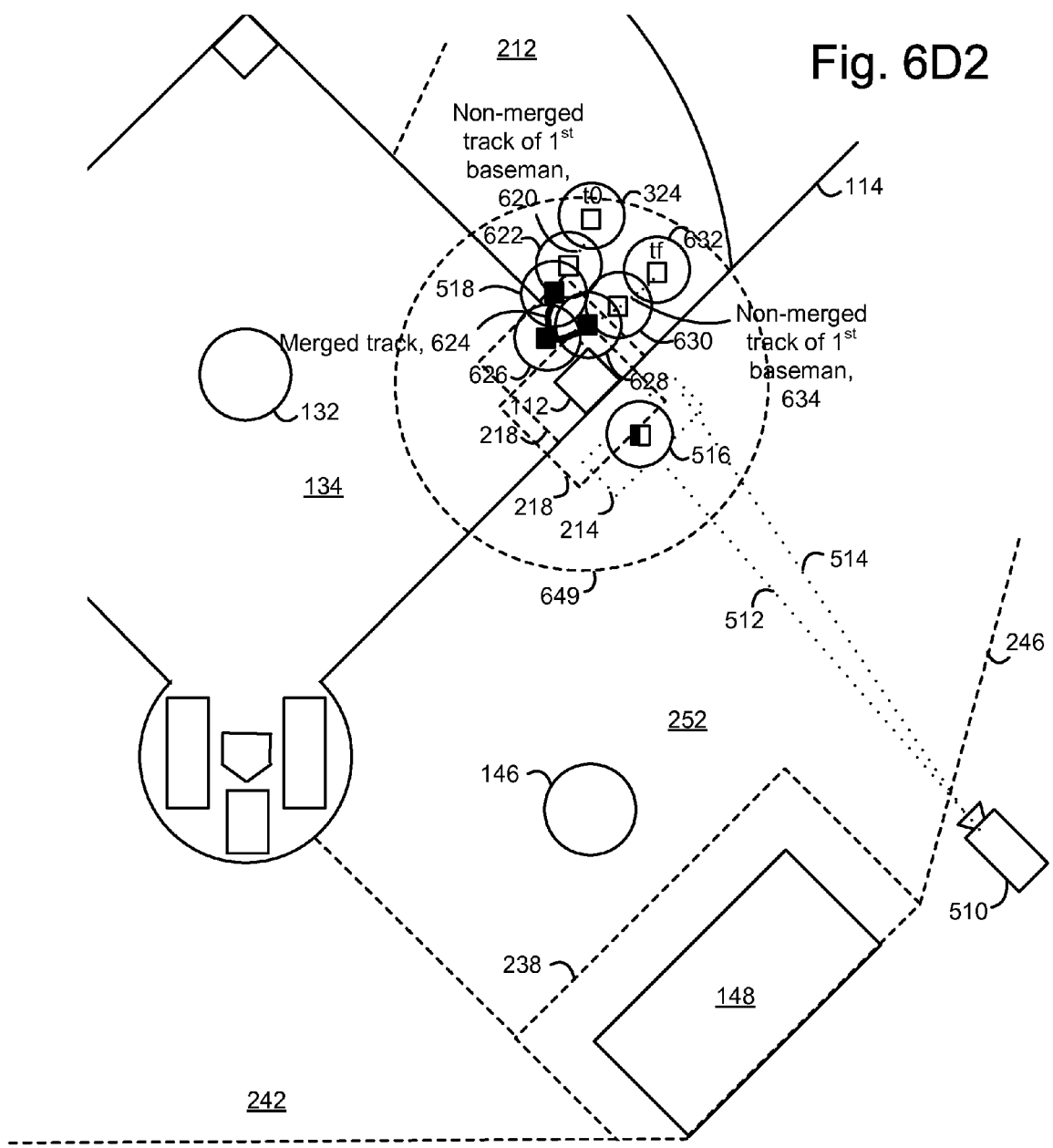

Fig. 6D3

Digital record for 1st base coach, camera 510

| time | location (Xw,Yw) | region | merged track? | merge resolved? | resolved by: | merged with: |
|---|---|---|---|---|---|---|
| t0 | 28,23 | 214 | n | | | |
| t1 | 28,23 | 214 | n | | | |
| t2/tms | 28,23 | 214 | y | y | t4-t6 | 1st bsmn |
| t3 | 28,23 | 214 | y | y | t4-t6 | 1st bsmn |
| t4/tme | 28,23 | 214 | y | y | t4-t6 | 1st bsmn |
| t5 | 28,23 | 214 | n | | | |
| t6 | 28,23 | 214 | n | | | |

Fig. 6D4

Digital record for 1st baseman, camera 510

| time | location (Xw,Yw) | region | merged track? | merge resolved? | resolved by: | merged with: |
|---|---|---|---|---|---|---|
| t0 | 28,23 | 212 | n | | | |
| t1 | 28,23 | 212 | n | | | |
| t2/tms | 28,23 | 218 | y | y | t4-t6 | 1st bs co |
| t3 | 28,23 | 218 | y | y | t4-t6 | 1st bs co |
| t4/tme | 28,23 | 218 | y | y | t4-t6 | 1st bs co |
| t5 | 28,23 | 212 | n | | | |
| t6 | 28,23 | 212 | n | | | |

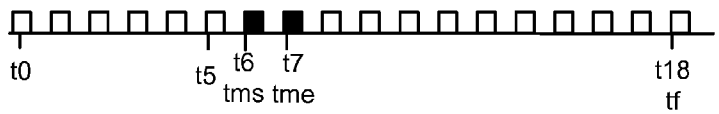
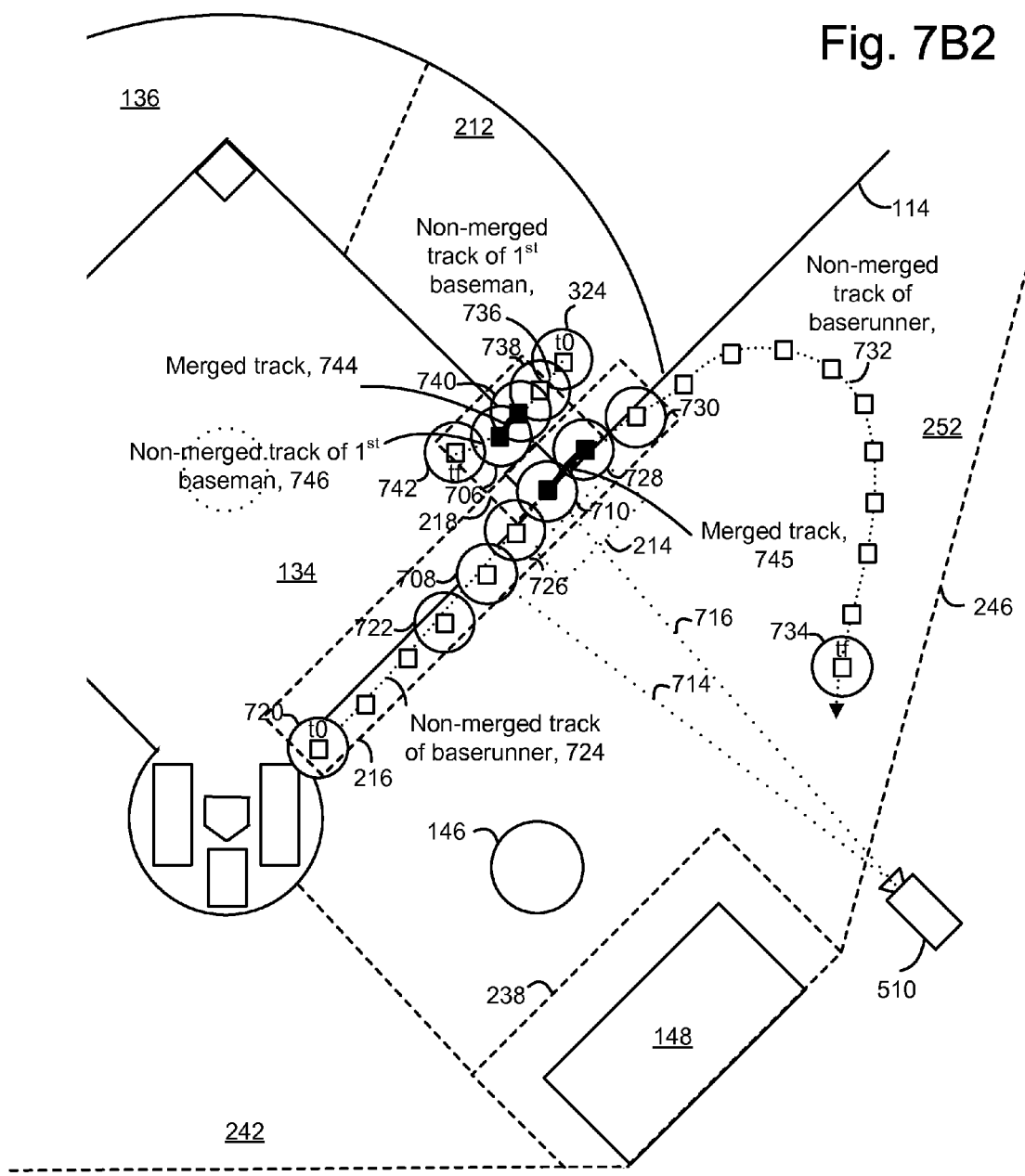
Fig. 7B1
Fig. 7B2

Fig. 7B3

Digital record for 1st baseman, camera 510

| time | location (Xw,Yw) | region | merged track? | merge resolved? | resolved by: | merged with: |
|---|---|---|---|---|---|---|
| t0 | 24,32 | 212 | n | | | |
| t1 | 24,32 | 212 | n | | | |
| t2 | 24,32 | 212 | n | | | |
| t3 | 24,32 | 212 | n | | | |
| t4 | 24,32 | 212 | n | | | |
| t5 | 23,31 | 218 | n | | | |
| t6/tms | 20,28 | 218 | y | y | t0-t5,t8-t18 | bs rnr |
| t7/tme | 19,27 | 218 | y | y | t0-t5,t8-t18 | bs rnr |
| t8 | 19,27 | 218 | n | | | |
| t9 | 19,27 | 218 | n | | | |
| t10 | 19,27 | 218 | n | | | |
| t11 | 19,27 | 218 | n | | | |
| t12 | 16,26 | 218 | n | | | |
| t13 | 16,26 | 218 | n | | | |
| t14 | 16,26 | 218 | n | | | |
| t15 | 16,26 | 218 | n | | | |
| t16 | 16,26 | 218 | n | | | |
| t17 | 16,26 | 218 | n | | | |
| t18 | 16,26 | 218 | n | | | |

Fig. 7B4

Digital record for 1st base runner, camera 510

| time | location (Xw,Yw) | region | merged track? | merge resolved? | resolved by: | merged with: |
|---|---|---|---|---|---|---|
| t0 | 6,4 | 216 | n | | | |
| t1 | 8,6 | 216 | n | | | |
| t2 | 12,11 | 216 | n | | | |
| t3 | 15,13 | 216 | n | | | |
| t4 | 18,16 | 216 | n | | | |
| t5 | 20,19 | 216 | n | | | |
| t6/tms | 22,22 | 216 | y | y | t0-t5,t8-t18 | 1st bs man |
| t7/tme | 24,25 | 216 | y | y | t0-t5,t8-t18 | 1st bs man |
| t8 | 28,28 | 216 | n | | | |
| t9 | 32,30 | 252 | n | | | |
| t10 | 35,32 | 252 | n | | | |
| t11 | 39,32 | 252 | n | | | |
| t12 | 41,31 | 252 | n | | | |
| t13 | 44,28 | 252 | n | | | |
| t14 | 45,25 | 252 | n | | | |
| t15 | 45,22 | 252 | n | | | |
| t16 | 45,18 | 252 | n | | | |
| t17 | 44,14 | 252 | n | | | |
| t18 | 44,8 | 252 | n | | | |

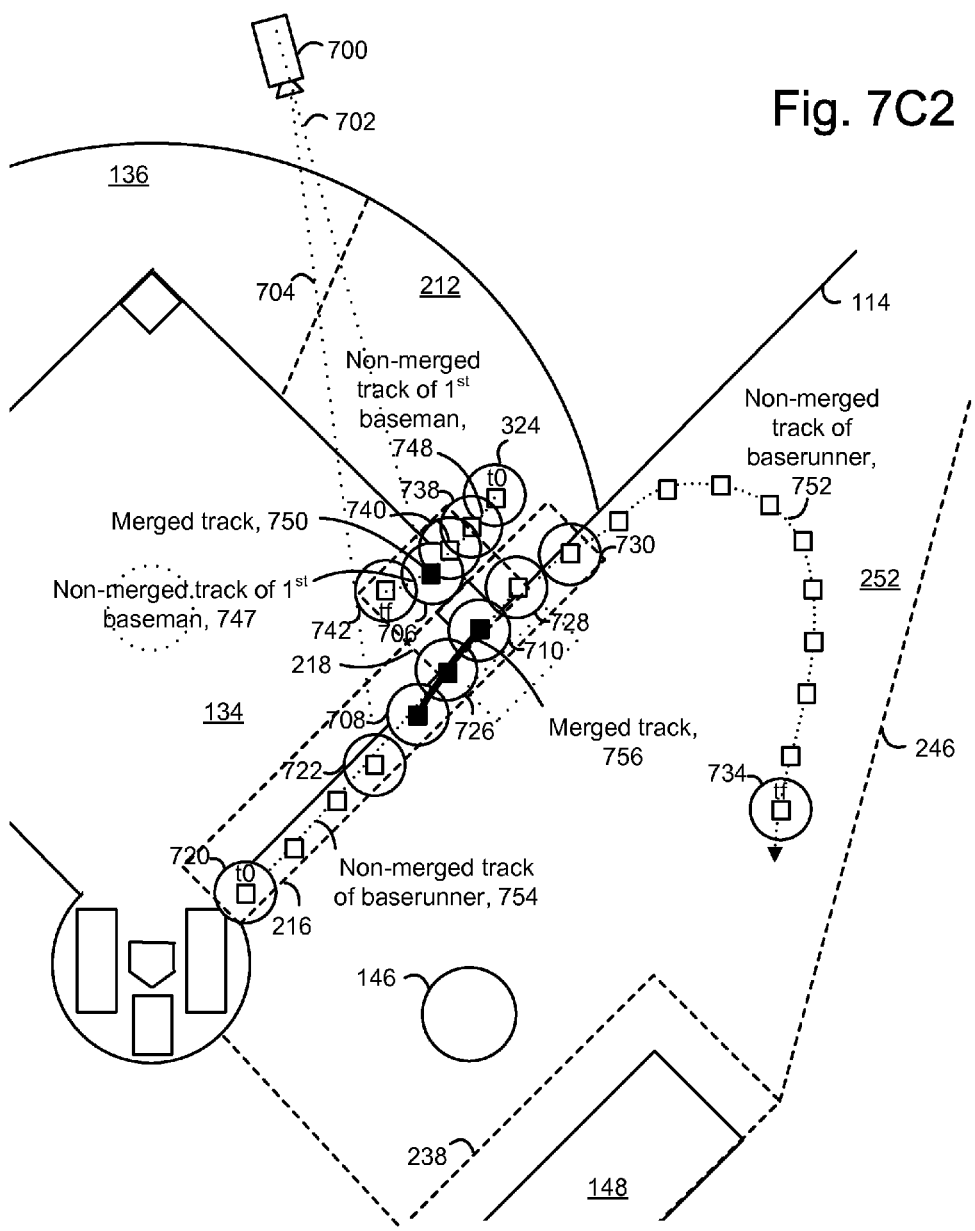
Fig. 7C1
Fig. 7C2

Fig. 7C3 — Digital record for 1st baseman, camera 700

| time | location (Xw,Yw) | region | merged track? | merge resolved? | resolved by: | merged with: |
|---|---|---|---|---|---|---|
| t0 | 24,32 | 212 | n | | | |
| t1 | 24,32 | 212 | n | | | |
| t2 | 24,32 | 212 | n | | | |
| t3 | 24,32 | 212 | n | | | |
| t4/tms | 24,32 | 212 | y | y | t0-t3,t7-t18 | 1st bs run |
| t5 | 23,31 | 218 | y | y | t0-t3,t7-t18 | 1st bs run |
| t6/tme | 20,28 | 218 | y | y | t0-t3,t7-t18 | 1st bs run |
| t7 | 19,27 | 218 | n | | | |
| t8 | 19,27 | 218 | n | | | |
| t9 | 19,27 | 218 | n | | | |
| t10 | 19,27 | 218 | n | | | |
| t11 | 19,27 | 218 | n | | | |
| t12 | 16,26 | 218 | n | | | |
| t13 | 16,26 | 218 | n | | | |
| t14 | 16,26 | 218 | n | | | |
| t15 | 16,26 | 218 | n | | | |
| t16 | 16,26 | 218 | n | | | |
| t17 | 16,26 | 218 | n | | | |
| t18 | 16,26 | 218 | n | | | |

Fig. 7C4 — Digital record for 1st base runner, camera 700

| time | location (Xw,Yw) | region | merged track? | merge resolved? | resolved by: | merged with: |
|---|---|---|---|---|---|---|
| t0 | 6,4 | 216 | n | | | |
| t1 | 8,6 | 216 | n | | | |
| t2 | 12,11 | 216 | n | | | |
| t3 | 15,13 | 216 | n | | | |
| t4/tms | 18,16 | 216 | y | y | t0-t3,t7-t18 | 1st bs man |
| t5 | 20,19 | 216 | y | y | t0-t3,t7-t18 | 1st bs man |
| t6/tme | 22,22 | 216 | y | y | t0-t3,t7-t18 | 1st bs man |
| t7 | 24,25 | 216 | n | | | |
| t8 | 28,28 | 216 | n | | | |
| t9 | 32,30 | 252 | n | | | |
| t10 | 35,32 | 252 | n | | | |
| t11 | 39,32 | 252 | n | | | |
| t12 | 41,31 | 252 | n | | | |
| t13 | 44,28 | 252 | n | | | |
| t14 | 45,25 | 252 | n | | | |
| t15 | 45,22 | 252 | n | | | |
| t16 | 45,18 | 252 | n | | | |
| t17 | 44,14 | 252 | n | | | |
| t18 | 44,8 | 252 | n | | | |

VIDEO TRACKING OF BASEBALL PLAYERS TO DETERMINE THE END OF A HALF-INNING

CROSS-REFERENCE TO RELATED APPLICATIONS

This application is a divisional application of U.S. patent application Ser. No. 12/976,766, filed Dec. 22, 2010, published as US 2012/0162435 on Jun. 28, 2012 and issued as U.S. Pat. No. 8,659,663 on Feb. 25, 2014, titled "Video Tracking Of Baseball Players To Determine The Start Of A Half-Inning" and incorporated herein by reference.

This application is related to commonly-assigned co-pending U.S. patent application Ser. No. 12/976,758, filed Dec. 22, 2010, published as US 2012/0162434 on Jun. 28, 2012 and issued as U.S. Pat. No. 9,007,463 on Apr. 14, 2015, titled "Video Tracking Of Baseball Players Which Identifies Merged Participants Based On Participant Roles" and incorporated herein by reference.

BACKGROUND

Baseball is one of the most popular sporting events. Television producers seek to entertain and inform audiences by employing the latest production techniques. For example, multiple camera angles, high-definition video and specialized equipment are used. Moreover, additional information such as graphics, player statistics and other information can be provided. A human scorekeeper typically observes events of the game and provides a record. However, it would be desirable to provide automated techniques for detecting events in a game, and for providing a digital record of the game.

SUMMARY

Automated techniques for detecting events in a game, and for providing a digital record of the game, are provided.

In one embodiment, video frames are analyzed to determine a track for the participants in the game, e.g., players and coaches. The track represents the movement of a participant in the baseball park in a time interval. For example, this movement could be on or off the playing field. In one approach, the tracks can be used to detect one or more events which indicate that a particular portion of the game is about to occur, such as the start of a half-inning of the game, or whether a particular portion of the game has occurred, such as the end of a half-inning of the game. For example, the imminent start of a half-inning can be indicated by events such as: the participants leaving the dugout region and entering the playing field, including the outfield, a participant leaving the dugout region and entering the region of a base coach's box, a pitcher throwing pitches when no batter is present, and players on the playing field throwing the ball back and forth to one another. Bodily movements of the participants can also be analyzed, such as to identify a participant throwing a pitch. Subsequently, one or more events are detected which indicate that the start of the half-inning has occurred. A digital record of the baseball game is updated to indicate that the start of the half-inning has occurred, in response to determining that the start of the half-inning is about to occur and determining that the start of the half-inning has occurred.

The end of a half-inning can be considered to have occurred, e.g., when the tracks of multiple participants indicate that the multiple participants have moved to the dugout region from the playing field within a specified time interval, have reached at least a specified minimum speed when moving to the dugout region from the playing field, or when at least one of the tracks indicates that one of the participants has moved from a coach's box region of the baseball park to a dugout region of the baseball park.

Corresponding methods, systems and computer- or processor-readable storage devices for performing the methods provided herein are provided.

BRIEF DESCRIPTION OF THE DRAWINGS

FIG. 1A depicts a baseball park and equipment for obtaining video images.

FIG. 3B1 depicts tracks of participants in the baseball park of FIG. 1A which are indicative of the end of a half-inning of a baseball game.

FIG. 3B2 depicts a digital record for the locations of the left fielder in FIG. 3B1.

FIG. 3B3 depicts the locations of the left fielder in FIG. 3B1, consistent with the digital record of FIG. 3B2.

FIG. 5E1 depicts a timeline of the participants in FIG. 5E2 indicating merged and non-merged time intervals, from the perspective of the camera 500 of FIG. 5A.

FIG. 5E2 depicts a portion of the baseball park of FIG. 5A, showing tracks of a pitcher and a coach in a time interval.

FIG. 5E3 depicts a digital record for the locations of the pitcher in FIG. 5E2.

FIG. 5E4 depicts a digital record for the locations of the coach in FIG. 5E2.

FIG. 6A depicts a video image of a first baseman and a base coach who are not merged, from the viewpoint of the camera 510 of FIG. 5B.

FIG. 6C depicts an outline image of the video image of FIG. 6B.

FIG. 6D1 depicts a timeline of the participants in FIG. 6D2 indicating merged and non-merged time intervals, from the perspective of the camera 510 of FIG. 5A.

FIG. 6D2 depicts a portion of the baseball park of FIG. 5A, showing tracks of a first baseman and a base coach in a time interval, corresponding to the timeline of FIG. 6D1.

FIG. 6D3 depicts a digital record for the first base coach in FIG. 6D2.

FIG. 6D4 depicts a digital record for the first baseman in FIG. 6D2.

FIG. 7B1 depicts a timeline of the participants in FIG. 7B2 indicating merged and non-merged time intervals, from the perspective of the camera 510 of FIG. 7A.

FIG. 7B2 depicts a portion of the baseball park of FIG. 7A, showing tracks of a first baseman and a first base runner in a time interval, corresponding to the timeline of FIG. 7B1.

FIG. 7B3 depicts a digital record for the first baseman in FIG. 7B2, from the perspective of camera 510.

FIG. 7B4 depicts a digital record for the first base runner in FIG. 7B2, from the perspective of camera 510.

FIG. 7C1 depicts a timeline of the participants in FIG. 7C2 indicating merged and non-merged time intervals, from the perspective of the camera 700 of FIG. 7A.

FIG. 7C2 depicts a portion of the baseball park of FIG. 7A, showing tracks of a first baseman and a runner headed to first base in a time interval, corresponding to the timeline of FIG. 7C1.

FIG. 7C3 depicts a digital record for the first baseman in FIG. 7C2, from the perspective of camera 700.

FIG. 7C4 depicts a digital record for the first base runner in FIG. 7C2, from the perspective of camera 700.

DETAILED DESCRIPTION

Figure 1B:
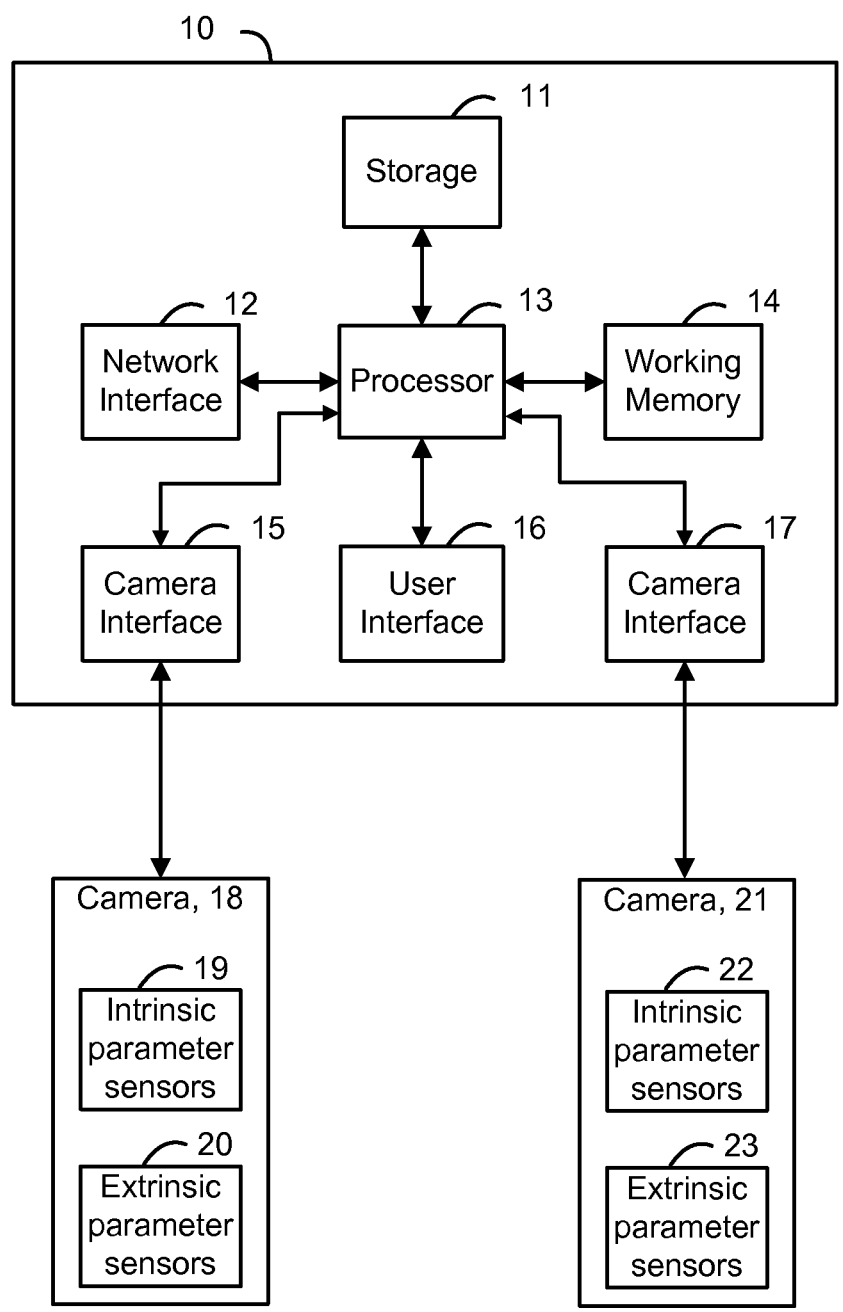
FIG. 1B depicts further details of the processing facility and cameras of FIG. 1A.

Automated techniques for detecting events in a game, and for providing a digital record of the game, are provided.

FIG. 1A depicts a baseball park and equipment for obtaining video images. While a baseball game is provided as example, the techniques provided herein can be applied to other sporting events as well which involve opposing teams and a game ball. A baseball park 100 can be a baseball stadium or a smaller facility, and includes a baseball field 102. A number of video cameras obtain video images of the game as it transpires in the baseball park. The video cameras can be, e.g., special purpose machine vision cameras for tracking, or television video cameras. For example, two cameras located at different heights, e.g., cameras 160 and 162, are depicted. Any number of cameras can be used. In one approach, two to six cameras, capturing color or monochrome images, can be used. The cameras have different points of view of the baseball park. A processing facility 164 receives and processed frames of video images from the cameras. In one approach, the processing facility 164 is a mobile facility such as a truck which is parked outside the baseball park. The processing facility 164 can subsequently transmit the captured images and other information via an antenna 145, to another location such as a television broadcast facility. In another approach, the processing facility can be remote from the baseball park 100. Or, the processing facility can be a permanent facility, neither mobile nor remote, such as one which is inside the baseball park.

The baseball park includes a playing field 102 which can be arranged according to standard rules of baseball in the US, as described in the "Official Baseball Rules" of Major League Baseball (MLB). A baseball game can include game which is played according to these rules or similar rules. The boundaries of the playing field are the foul lines 114 and 124, the outfield boundary 126 which may be a fence or wall, and the semicircle 107 around home plate 104. Line 130 is the boundary between the outfield 138 and the infield. The infield includes a square/diamond region (including two sides 120 and 116) between the four bases 104, 112, 118 and 122. The infield also includes a curved region 136 which is between the regions 134 and 138. Also provided are: a left-side batter's box 106, a right-side batter's box 108, a catcher's box 110, a first base coach's box 140, a third base coach's box 142, a pitcher's mound 132, on-deck circles 144 and 146, and dugouts 150 and 148.

Additional cameras can be used as well to increase the accuracy of the tracking. As mentioned, the cameras can be, e.g., special purpose machine vision cameras. Or, television broadcast cameras can be used which capture thirty frames or sixty fields per second, in one possible approach. Such cameras sense visible light. The locations of objects in the baseball park, including participants and the baseball, can be described in terms of a world coordinate system, also known as a free space coordinate system, which is fixed relative to the earth or other environment of interest, in one approach. The world coordinate system includes orthogonal directions represented by a Yw axis, an Xw axis, and a Zw axis (not shown) which extends out of the page. An origin of the world coordinate system is chosen to be at the edge of home plate 104, as an example.

Each camera can be provided with sensors which detect intrinsic and extrinsic parameters of the camera when these parameters are variable. Intrinsic parameters, such as focal length, lens distortion and zoom setting represent characteristics of the camera design and settings, and do not depend on the position and orientation of the camera in space. Extrinsic parameters, such as tilt or pan, depend on the position and orientation of the camera in space. Such sensors can be provided using techniques known to those skilled in the art. For example, pan and tilt sensors can be attached to a tripod on which the camera is mounted. See, e.g., U.S. Pat. No. 5,912,700, issued Jun. 15, 1999, and incorporated herein by reference. The sensors can be used to determine the field of view of the camera, e.g., where the camera is pointing and what it can see. Or, the cameras can be stationary and fixed so that they do not pan, tilt or zoom dynamically. In this case, broadcast cameras with a pan-tilt-zoom (PTZ) capability could potentially be used to assist in tracking.

It is also possible to determine camera extrinsic and intrinsic parameters without sensors, e.g., as described in Tsai's method. See, e.g., Tsai, Roger Y. (1986) "An Efficient and Accurate Camera Calibration Technique for 3D Machine Vision," Proc. of IEEE Conf. on Computer Vision and Pattern Recognition, Miami Beach, Fla., 1986, pp. 364-374. For example, one approach to determine the intrinsic and extrinsic parameters of a camera involves placing marks in various measured or known locations in the event facility such that each mark looks different and at least one mark will always be visible to the camera while the camera is pointed at the event facility. A computer using optical recognition technology can find the mark in the video frame and, based on the mark's size and position in the video frame, determine the camera parameters. Another approach to determining intrinsic and extrinsic parameters of a camera involves placing marks in various measured or known locations in the event facility such that each mark looks different, but the marks may be removed after camera parameters have been determined. A computer implementing a camera parameter estimation algorithm based on manual user interaction rather than, or in addition to, image recognition can determine camera parameters.

The processing facility 164 includes equipment which receives and stores the captured images, time stamps the captured images, and processes the captured images to determine locations of objects such as participants (e.g., players and coaches) and the baseball, at successive points in time, e.g., based on the times at which the video frames were captured. When the captured images are provided in video signals from the cameras, the processing facility 164 can enhance the video signals based on the determined locations of the object, such as by displaying a graphic which depicts the locations. A series of successive locations of a participant or ball in the baseball park can be represented as a track. Generally, the locations of the participants in the baseball park can be determined by identifying pixels in the video frames which correspond to human figures, and determining a location in the baseball park based on locations of the identified pixels in the video frames, and based on sensor and registration data of the one or more cameras. Statistical information regarding the object can be obtained, including location, speed, direction, distance traveled, height, time in the air and so forth.

FIG. 1B depicts further details of the processing facility and cameras of FIG. 1A. The computer system 10 is a simplified representation of a system which might be used at the processing facility 164 (FIG. 1A), for instance. The computer system 10 includes a storage device 11 such as a hard disk or portable media, a network interface 12 for communicating with other computer systems, one or more processors 13 for executing software instructions, a working memory 14 such as RAM for storing the software instructions after they are loaded from the storage device 11, for instance, camera interfaces 15 and 17, and a user interface display 16. The storage device 11 may be considered to be a processor readable storage device having processor readable code embodied thereon for programming the processor 13 to perform methods for providing the functionality discussed herein. The user interface display 16 can provide information to a human operator based on the data received from the cameras via the interfaces 15 and 17. The user interface display 16 can use any known display scheme, whether graphical, tabular or the like. In addition to an on-screen display, an output such as a hard copy from a printer can be provided to report results. Results can also be reported by storing data at the storage device 11 or other memory, e.g., for later use. Results could also be sent via the network interface and the Internet or other wide area network, to another, central storage location. The results can include a digital record of a baseball game.

An example camera 18 includes intrinsic parameter sensors 19 and extrinsic parameter sensors 20. The intrinsic parameter sensors 19 can identify a zoom setting, whether an expander is used and so forth. The extrinsic parameter sensors 20 can identify an orientation of the camera, such as a pan and tilt of the camera. Note that sensors are not needed when the parameter of concern is not changing. The camera 18 communicates image data, whether analog or digital, in addition to data from the intrinsic parameter sensors 19 and the extrinsic parameter sensors 20 to the computer system 10 via the camera interface 15. Similarly, another camera 21 with intrinsic parameter sensors 22 and extrinsic parameter sensors 23 can communicate data to the camera interface 17. Data from more than two cameras can be received as well.

Further, the functionality described herein may be implemented using one or more processor readable storage devices (e.g., 11 and 14) having processor readable code embodied thereon for programming one or more processors to perform the processes described herein. The processor readable storage devices can include non-transitory, tangible computer readable media such as volatile and nonvolatile media, removable and non-removable media. Computer readable media includes volatile and nonvolatile, removable and non-removable media implemented in any method or technology for storage of information such as computer readable instructions, data structures, program modules or other data. Computer readable media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other non-transitory, tangible medium which can be used to store the desired information and which can be accessed by a computer.

Figure 1C:
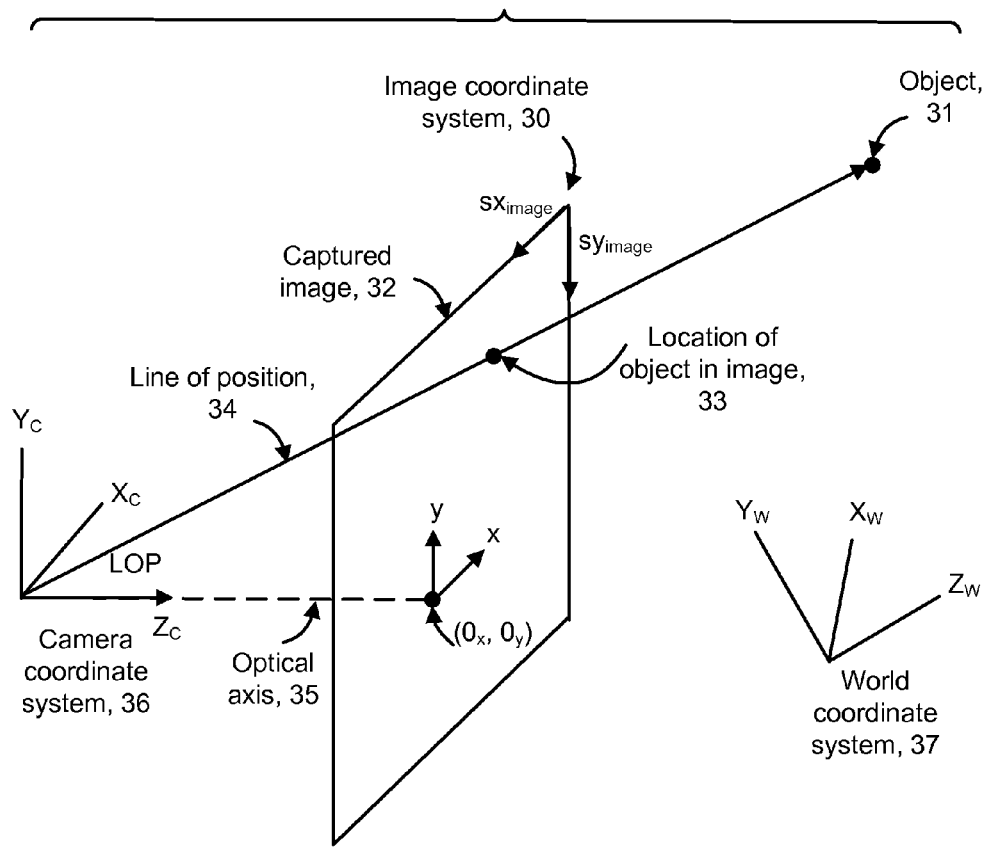
FIG. 1C depicts a relationship between camera, image and world coordinate systems, for use by the processing facility of FIG. 1A in detecting objects in the baseball park.

FIG. 1C depicts a relationship between camera, image and world coordinate systems, for use by the processing facility of FIG. 1A in detecting objects in the baseball park. A camera coordinate system 36, which includes orthogonal axes $X_C$, $Y_C$ and $Z_C$ in three dimensions, is fixed relative to the camera. The origin of the coordinate system may be at the center of the lens, in one possible approach, modeling the camera as a pinhole camera. An image coordinate system 30, also referred to as pixel space, includes orthogonal axes X and Y in two-dimensions, and is fixed relative to a captured image 32. A world coordinate system 37, which includes orthogonal axes $X_W$, $Y_W$ and $Z_W$, is fixed relative to, e.g., the earth, a baseball park or other event site, or other reference point or location. Generally, it is desirable to describe the position and/or path of the tracked object 31 in the world coordinate system 37 as this is typically the coordinate system in which its motion is most relevant to the user, and allows easier integration of the information from several cameras. The line of position 34 is an imaginary line which extends from the origin of the camera coordinate system 36 through a pixel in the image 32, intersecting the pixel at a point 33, and through the tracked object 31. Each pixel in the image 32 corresponds to a different line of position. Point 33 in the captured image 32 represents the location of the object 31 in the image. The location of the object in the image 32 can be represented by coordinates (sx, sy) in a coordinate system which has its origin at a corner of the image, in one approach. The coordinates may identify the center of the object. When the object is a tracked human participant, characteristics such as the outline of the participant can be detected.

Further, the line of position can be represented by a 3-D vector (LOP) which has unity magnitude, in one approach. The vector can be defined by two points along the LOP. The vector can be represented in the world coordinate system 37 using an appropriate transformation from the image coordinate system. The $Z_C$ axis of the camera coordinate system, which is the optical axis 35 of the camera, intersects the captured image at a point represented by coordinates $(0_x, 0_y)$. A two-dimensional coordinate system extending from $(0_x, 0_y)$ can also be defined.

The camera registration process involves obtaining one or more transformation matrices which provide a conversion between the image coordinate system 30 and the world coordinate system 37. Further information can be found in E. Trucco and A. Verri, "Introductory techniques for 3-D computer vision," chapter 6, Prentice Hall, 1998, U.S. Pat. No. 5,912,700, issued Jun. 15, 1999, and U.S. Pat. No. 6,133,946, issued Oct. 17, 2000, each of which is incorporated herein by reference.

Figure 2A:
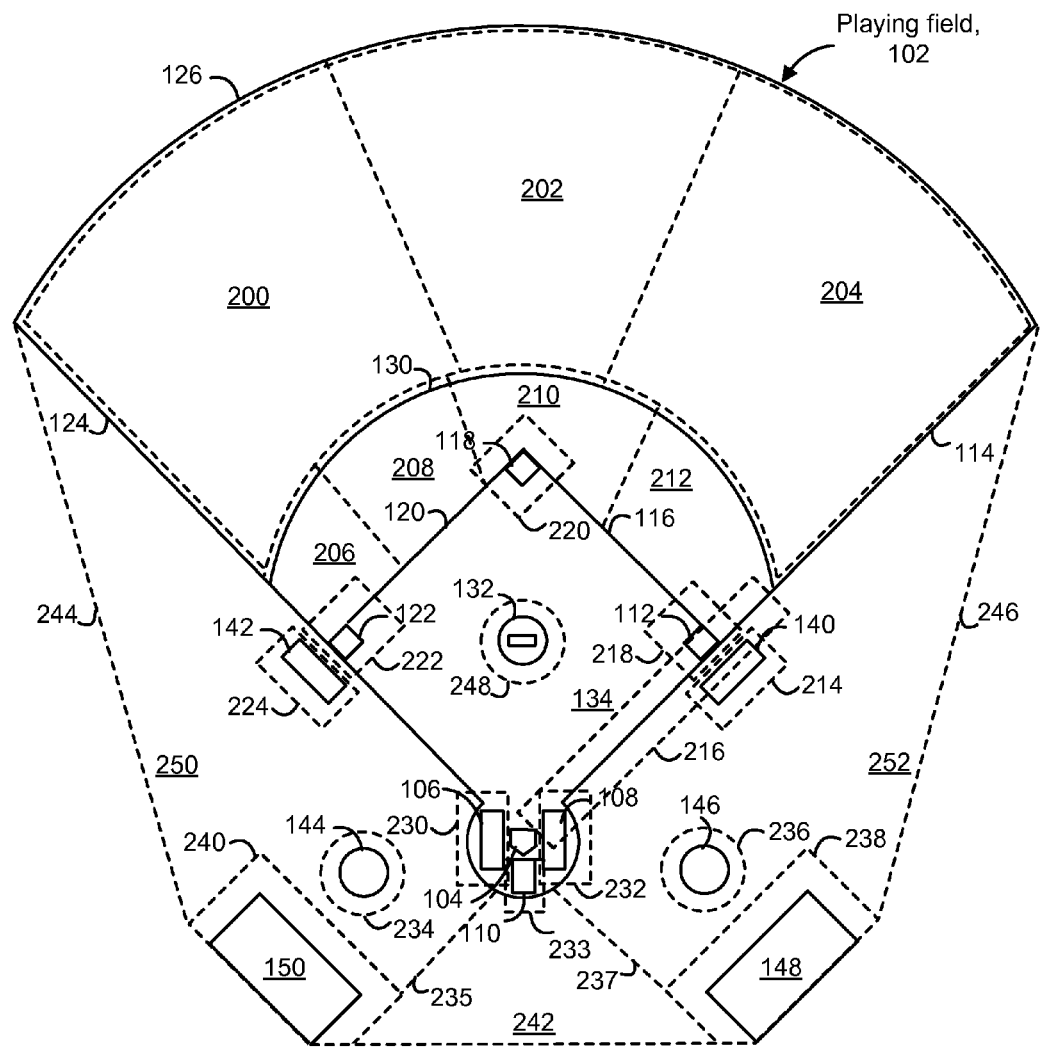
FIG. 2A depicts regions of the baseball park of FIG. 1A including regions on and off the playing field.

FIG. 2A depicts regions of the baseball park of FIG. 1A including regions on and off the playing field. By subdividing the baseball park into regions, the locations of the participants can be associated with a particular region at a particular point in time in the digital record. Ideally, a record can be provided which identifies the location of each participant throughout the game, where each location at time t, L(t), is provided by coordinates such as world coordinate (Xw(t),Yw(t)). Further, each location can be mapped to one of the regions shown. In practice, the regions can be configured in different ways, and the example provided is one possible implementation. Regions may overlap, since the range of positions of the participants may overlap. For example, the first baseman's region 212 can overlap with the first base runner's region 216, and both regions can include first base.

The outfield is divided into a left field region 200, a center field region 202 and a right field region 204. A left-side out-of-bounds (or foul territory) region 250 is bounded by the left-side out-of-play boundary 244, left-side foul line 124, and line 235, and excludes the dugout region 240. The region 250 could also exclude the third base line coach's box region 224 and the left-side on-deck circle region 234. A right-side out-of-bounds region 252 is bounded by the right-side out-of-play boundary 246, right-side foul line 114, and line 237, and excludes the dugout region 238. The region 252 could also exclude the first base line coach's box region 214 and the right-side on-deck circle region 236. A central, out-of-bounds region 242 is bounded by lines 235 and 237. Also provided are a catcher's box region 233, a left-side batter's box region 230, a right-side batter's box region 232, a first base runner's region 216, a first base region 218, a second base region 220, a third base region 222, a first baseman's region 212, a second baseman's region 210, a shortstop's region 208, a third baseman's region 206, and a pitcher's mound region 248. The dugout regions are separate from the playing field. These regions are defined around landmarks on the playing field to determine if a participant is at the landmark. For example, a participant in the region 218 is assumed to be at first base. A landmark can include, e.g., a base, a pitcher's mound or an area marked by chalk lines, such as an on-deck circle, coach's boss, catcher's box or batter's box. Each region can have a specified size, and be positioned in specified way with respect to an associated landmark.

Figure 2B:
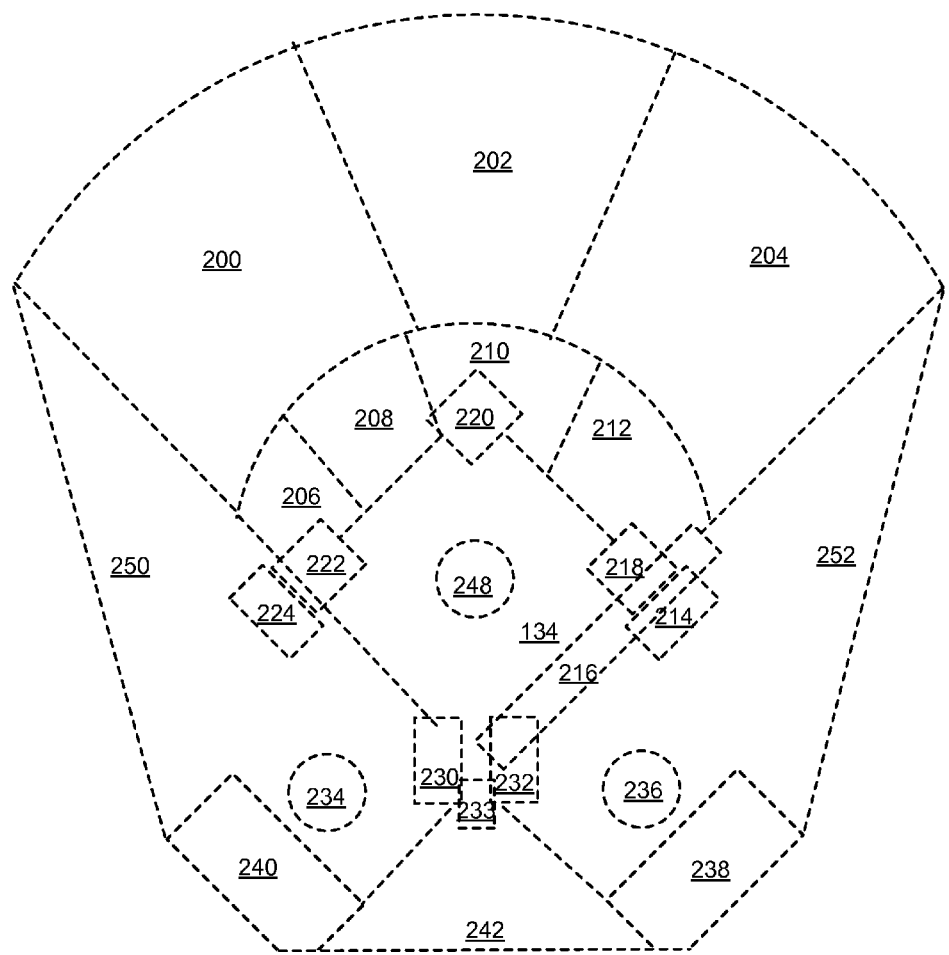
FIG. 2B depicts the regions of FIG. 2A.

FIG. 2B depicts the regions of FIG. 2A. Here, for greater clarity, only the regions are depicted.

Figure 3A:
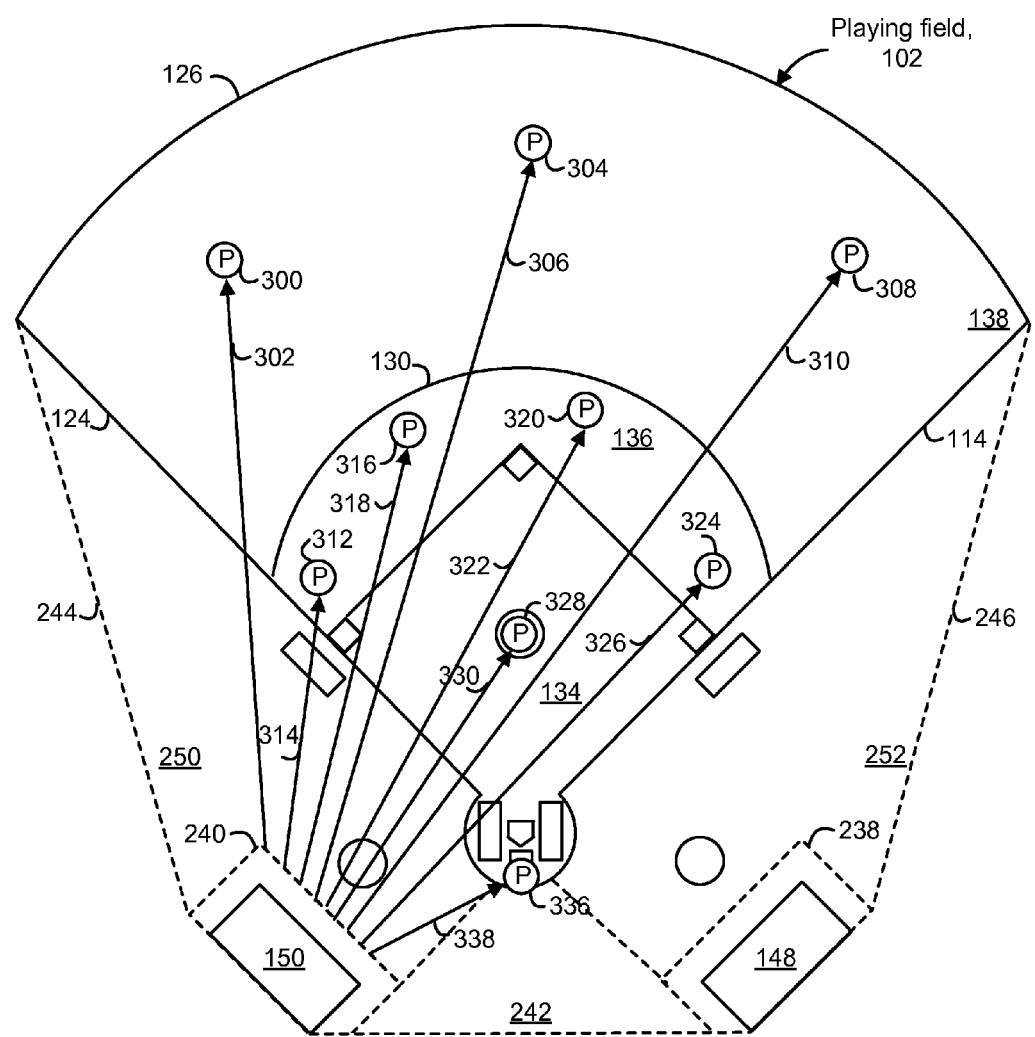
FIG. 3A depicts tracks of participants in the baseball park of FIG. 1A which are indicative of the start of a half-inning of a baseball game.

FIG. 3A depicts tracks of participants in the baseball park of FIG. 1A which are indicative of the start of a half-inning of a baseball game. According to common baseball rules, a game is played between two teams, each composed of nine players, that take turns playing offense (hitting) and defense (fielding or pitching). A half-inning is a period in which one team assumes the offense role and the other team assumes the defense role, until three outs are recorded. A full inning includes two half-innings. The start of the first half-inning is the same as the start of the full inning, and the end of the second half-inning is the same as the end of the full inning. In providing a digital record of a baseball game, it is helpful to automatically detect the start or end of a half-inning from video of the baseball park and to record this occurrence. Typically, a scorekeeper observes the start or end of a half-inning. An automated detection capability avoids the need to access the scorekeeper's system, and provides the ability to automatically cross-reference to associated video segments.

At the start of a half-inning of a baseball game, the players on the field which have been playing defense, return to the dugout region, and the players in the dugout, which have been playing offense, move onto the field. Typically, video images captured from the cameras show multiple players concurrently jogging from the dugout region to the playing field. Particular camera viewpoints can be especially useful in detecting this, such as an overhead viewpoint or other elevated viewpoint which sees the entire playing field. Each participant is represented by a circle with a "P" inside. For example, the left fielder 300 travels in a track/path 302, the center fielder 304 travels in a track 306, the right fielder 308 travels in a track 310, the third baseman 312 travels in a track 314, the shortstop 316 travels in a track 318, the second baseman 320 travels in a track 322, the first baseman 324 travels in a track 326, the pitcher 328 travels in a track 330 and the catcher 336 travels in a track 338. Each participant of the other team, which has concluded playing defense, travels to the dugout region 238, for instance. The first and third baseline coaches (not depicted) can also travel to the respective coach's boxes.

Generally, the digital record of the baseball game can be updated to indicate that the start of the half-inning is about to occur, if the tracks indicate that the start of the half-inning is about to occur, or to indicate that the end of the half-inning has occurred, if the tracks indicate that the end of the half-inning is about to occur. In one approach, the start of the half-inning can be defined as some time interval such as a few seconds before the first game pitch of the half-inning, i.e., the first pitch with the batter in the batter's box. Warm up pitching time is not counted as part of the half-inning, but it is a very good indication that the start of the half-inning is about to occur. An indication that the start of the half-inning is about to occur can be the detection of one or more events which are known to occur between successive half-innings, based on rules, traditions and other norms of the game, and which are associated with the start of a half-inning. These are events which are known to occur between successive half-innings but not typically during a half-inning.

The digital record can thus be updated to indicate that the start of the half-inning has actually occurred after it is updated to indicate that the start of the half-inning is about to occur. The updating of the digital record to indicate that the start of the half-inning has occurred can be based on detecting an event which is known to occur most often or always during a half-inning. One example is detecting a first thrown pitch when a batter is in a batter's box of the baseball park, after the tracks indicate that the start of the half-inning is about to occur. The detecting the first thrown pitch can include determining a bodily movement of one of the participants (e.g., the pitcher) based on the video frames, and determining that the bodily movement corresponds to a pitching motion. The detection of a thrown pitch can also be based on tracking the ball as it moves from the pitcher's mound to home plate.

In case the first thrown pitch is not detected, a later event such as a later thrown pitch, the batter swinging, or the batter running toward first base can indicate that the start of the half-inning has occurred. Thus, the combination of detecting an event (an inter-half-inning event) which is known to occur most often or always between half-innings followed by detecting another event (an intra-half-inning event) which is known to occur most often or always during a half-inning can be used to signal that a half-inning has started. Note that detecting an event which is known to occur most often or always during a half-inning may not be sufficient to determine that a half-inning has started (without detecting an event which is known to occur most often or always between half-innings) because many of these events will be detected.

In one approach, a condition is imposed in which the start of a half-inning is not found unless the intra-half-inning event follows the inter-half-inning event within a specified time interval such as several minutes.

In one approach, the end of the half-inning can be defined as when the last out is made in the half-inning. In contrast to the case of detecting the start of a half-inning using a combination of two events, the detection of one event which is known to most often or always occurs during a half-inning can be used to signal that a half-inning has ended. Note that the same detected one or more events can signal that both an end of a half-inning of the baseball game has occurred, and that a start of the next half-inning of the baseball game is about to occur. Or, a first event can signal that an end of a half-inning of the baseball game has occurred, and a subsequent second event can signal that a start of the next half-inning of the baseball game is about to occur.

Examples of events which are known to occur most often or always during a half-inning follow. With one criterion, the tracks indicate that the start of the half-inning is about to occur, e.g., is imminent, when the tracks of at least an integer number N>2 of the participants indicate that the at least N participants have moved from the dugout region to the playing field within a specified time interval. As more participants are detected moving from the dugout region to the playing field, there is a higher probability that the start of the inning is about to occur.

With another criterion, the tracks indicate that the start of the half-inning is about to occur when the tracks of the at least N participants indicate that the at least N participants have reached at least a specified minimum speed when moving from the dugout region to the playing field. Typically, the participants jog or run onto the field to move to their respective fielding positions, and the pitcher moves to the pitcher's mound. By obtaining a track which indicates a participant's locations at successive points in time, the instantaneous speed of the participant at the different time points can be determined, and a determination can be made that the participant is jogging.

With another criterion, the tracks indicate that the start of the half-inning is about to occur when the tracks of at least an integer number N>2 of the participants indicate that the at least N participants have moved from the dugout region to the outfield within a specified time interval.

With another criterion, the tracks indicate that the start of the half-inning is about to occur when at least one of the tracks indicates that one of the participants has moved to a coach's box region of the baseball park from a dugout region of the baseball park. This would be the coach of the team which assumes the offense role in the next half-inning.

Multiple criteria can be used to obtain a probability that the start of the half-inning is about to occur. For example, a higher probability can be associated with detecting the participants moving from the dugout region to respective regions in the playing field which are fielding locations, and remaining at those locations for a minimum amount of time. The probability can be in proportion to the amount of time at the fielding location. A fielding location can be the region of the baseball field in which a player is assigned. For example, region 212 in FIG. 2B is the fielding location of the first baseman, also referred to as the first baseman's region. A higher probability can be associated with detecting a greater number of participants moving from the dugout region to the field. A decision as to whether the start of the half-inning is about to occur can be made based on whether the probability exceeds a threshold. The threshold can be established by processing video data from multiple games.

In some case, the participants move from the dugout region to the left-side out-of-bounds region 250, such as to congratulate a player who is running from third base to home plate to score a run. However, this can be distinguished from the start of a half-inning because the participants do not move onto the playing field and, in fact, are forbidden from moving onto the playing field. In another case, the participants move from the dugout region to the infield square region 134 such as when there is a melee. However, this can be distinguished from the start of a half-inning because the participants do not move onto the playing field and remain in respective fielding positions. Nor do they moving to fielding positions in the outfield. In another case, a coach moves from the dugout region to the pitcher's mound to speak with the pitcher. However, this can be distinguished from the start of a half-inning because the coach does not move to a fielding position, nor do multiple participants move to the field, such as to fielding positions. In another case, a participant moves from the dugout region to the on-deck circle region. However, this can be distinguished from the start of a half-inning because the participant does not move onto the playing field.

FIG. 3B1 depicts tracks of participants in the baseball park of FIG. 1A which are indicative of the end of a half-inning of a baseball game. The end of a half-inning can be detected, e.g., by using the reverse of the criteria associated with the start of a half-inning. At the end of a half-inning of a baseball game, the players on the field which have been playing defense, return to the dugout region. Typically, video images captured from the cameras show multiple players concurrently jogging from the playing field to the dugout region. For example, the left fielder 300 travels in a track 342, the center fielder 304 travels in a track 348, the right fielder travels in a track 354, the third baseman 312 travels in a track 344, the shortstop 316 travels in a track 346, the second baseman 320 travels in a track 350, the first baseman 324 travels in a track 356, the pitcher 328 travels in a track 352 and the catcher 336 travels in a track 358. Each participant of the other team, which has concluded playing defense travels to the dugout region 238, for instance. The first baseline coach 332 travels in a track 360 back to the other team's respective dugout region 238. The third baseline coach (not depicted) can also travel back to the other team's respective dugout region 238.

With one criterion, the tracks indicate that the end of the half-inning has occurred when at least one of the tracks indicates that one of the participants has moved to a coach's box region of the baseball park from a dugout region of the baseball park. This would be the coach of the team which assumes the offense role in the next half-inning With another criterion, the tracks indicate that the end of the half-inning has occurred when the tracks of at least an integer number N>2 of the participants indicate that the at least N participants have moved to the dugout region from the playing field within a specified time interval. With another criterion, the tracks indicate that the end of the half-inning has occurred when the tracks of the at least N participants indicate that the at least N participants have reached at least a specified minimum speed when moving to the dugout region from the playing field. With another criterion, the tracks indicate that the end of the half-inning has occurred when at least one of the tracks indicates that one of the participants has moved from a coach's box region of the baseball park to a dugout region of the baseball park. This would be the coach of the team which concludes the offense role.

As before, multiple criteria can be used to obtain a probability that the end of the half-inning has occurred. For example, a higher probability can be associated with detecting a greater number of participants moving to the dugout region from the field.

FIG. 3B2 depicts a digital record for the locations of the left fielder in FIG. 3B1. FIG. 3B3 depicts the locations of the left fielder in FIG. 3B1, consistent with the digital record of FIG. 3B2.

As an example, the track 342 of the left fielder 300 is depicted at different time points t0-t5. In practice, many more time points can be obtained, e.g., several per second. In one approach, the location of a participant is determined for each video frame. The digital record is stored in a storage media, such as the storage media 11 in FIG. 1B. The digital record can be in the form of a database or table which includes an entry for each time point. A digital record can be provided for each participant. In some cases, a digital record can be provided for each camera which is used to detect a particular participant. A particular participant can be identified by his or her role or position in the baseball game. For example, for the team playing defense, there are nine available player roles. e.g., pitcher, catcher, first baseman, second baseman, shortstop, third baseman, left fielder, center fielder and right fielder.

For the team playing offense, there are player roles such as batter, base runners and on-deck hitter, and coach roles, such as first base coach and third base coach. For each team there are also coaches such as a head coach/manager, batting coach, bench coach, pitching coach and bullpen coach. Major League Baseball restricts the number of uniformed staff to six coaches and one manager during the course of a game. Further, participants can include umpire roles such as the home plate umpire, the base umpires (first base umpire, second base umpire, third base umpire) and two additional umpires which may be present during playoffs and other special games and are typically stationed along the outfield foul lines as the left-field and right-field umpires (as outfield umpires).

A player role could also be classified more generally such as an outfielder role (left fielder, center fielder or right fielder), or an infielder role (first baseman, second baseman, shortstop or third baseman).

A particular participant could also be identified by his or her name, jersey number or other identifier. Each entry can identify the time, the location of the participant (in world coordinates) and the corresponding region of the baseball park. The location coordinates provided can have any desired units. The magnitudes of the example location coordinate provided herein were measured based on actual locations in the drawings.

The time point t0 is the first time point in the track 342, and the final time point (tf) in the track is t5. Note that the locations associated with time points t0-t2 are in the region 200, the locations associated with time points t3 and t4 are in the region 250, and the location associated with time point t5 is in the region 240. The speed of the participant at the location of t2, for instance, can be determined from the distance between $(Xw(t2),Yw(t2))$ and $(Xw(t1),Yw(t1))$, divided by the time increment t2-t1. A similar analysis can be made for each of the other participants.

Figure 4A:
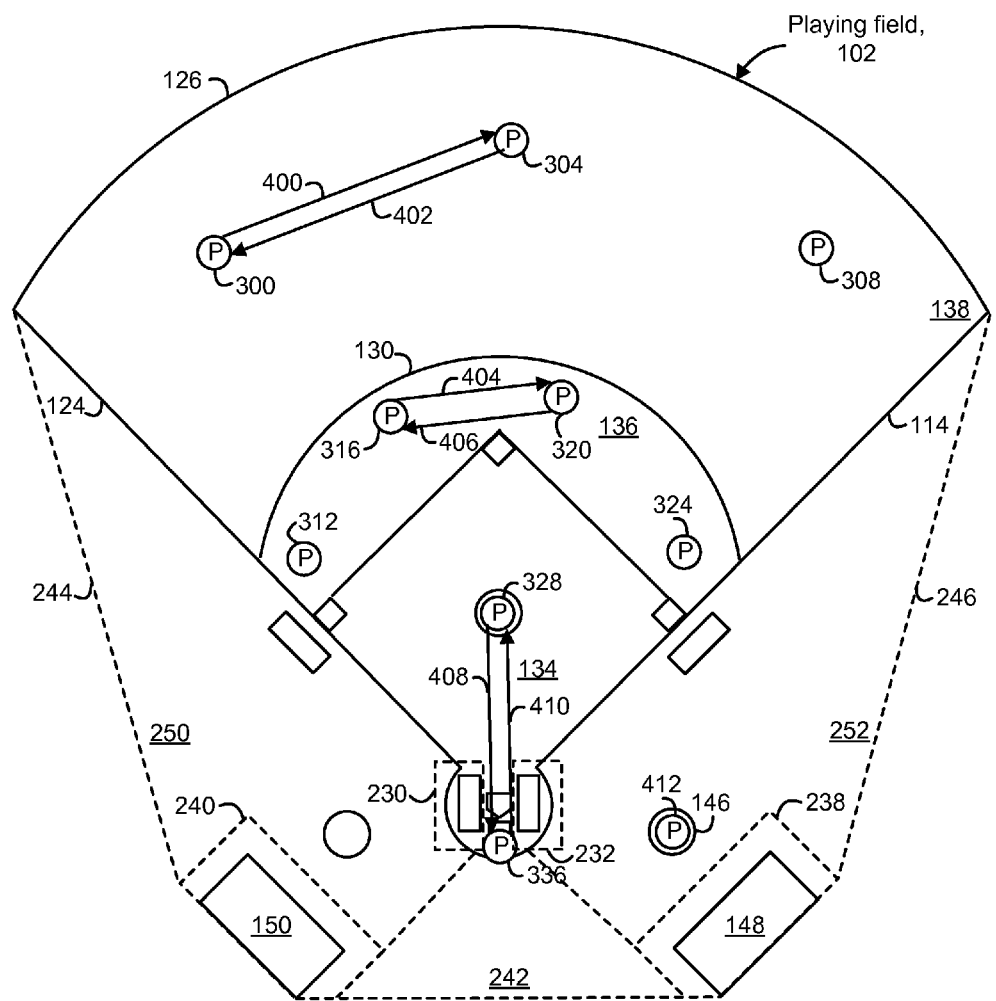
FIG. 4A depicts ball trajectories in the baseball park of FIG. 1A which are indicative of the start of a half-inning of a baseball game.

FIG. 4A depicts ball trajectories in the baseball park of FIG. 1A which are indicative of the start of a half-inning of a baseball game. As mentioned, the start of a half-inning can be detected based on various criteria which involve movement of the participants from the dugout region to the playing field. Another criterion involves determining one or more trajectories of a ball in the baseball park based on the video frames, and determining whether the start of the half-inning is about to occur based on the trajectories. For example, the trajectories can indicate that the start of the half-inning is about to occur when the trajectories extend from one participant to another participant, and back from the another participant to the one participant, indicating the participants are fielders warming up by playing catch. The trajectories can extend above the playing field, in the region outside the infield square. The infield square is the region bounded by the four bases. The region outside the infield square could include the regions 136 and 138, for instance, in FIG. 4A, or the corresponding subdivided regions such as in FIG. 3B3.

For example, trajectories 400 and 402 indicate that the left fielder 300 and the center fielder 304 are playing catch. Trajectories 404 and 406 indicate that the shortstop 316 and the second baseman 320 are playing catch. Detection of such activity is indicative of the start of a half-inning, since the players often warm up briefly in this manner. Moreover, the fact that several balls are in motion at the same time in different parts of the field is especially indicative of the onset of the start of a half-inning. Moreover, trajectory 408 denotes a warm-up pitch from the pitcher 328 to the catcher 336, and trajectory 410 denotes a return throw to the pitcher from the catcher. Under the baseball rules, at the start of a half-inning, an existing pitcher is permitted five warm-up pitches and a new pitcher is permitted eight warm-up pitches. Detection of such activity indicates that the start of a half-inning is about to occur, since the pitcher almost always warm ups in this manner. A determination that the start of a half-inning is about to occur can also involve a determination that no participant is in the batter's box regions 230 and 232, since warm up pitches are taken with no batter present. When the start of the half-inning does occur, the batter is present in the batter's box. Thus, warm up pitches with no batter present followed by the batter entering the batter's box region is a cue that the start of the half-inning has occurred.

A participant 412 of the team playing offense warms up in the on-deck circle 146.

Alternatively, or additionally, the fact that a pitcher has thrown a pitch can be detected by using the video frames to analyze the bodily movement of the participant who is located at the pitcher's mound. In this case, a determination of whether the start of the half-inning is about to occur can be based on the bodily movement, where the bodily movement indicates that the start of the half-inning of the baseball is about to occur when the bodily movement corresponds to a pitching motion, while no batter is detected in a batter's box region of the playing field, indicating that the participant is taking a warm up pitch.

Figure 4B:
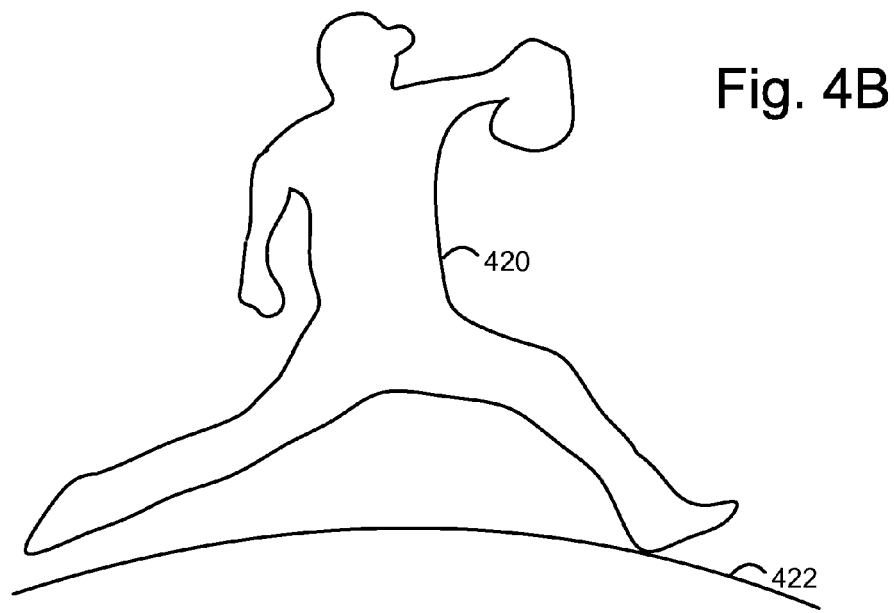
FIG. 4B depicts a video image of one bodily position of a participant which is indicative of a pitcher.
Figure 4C:
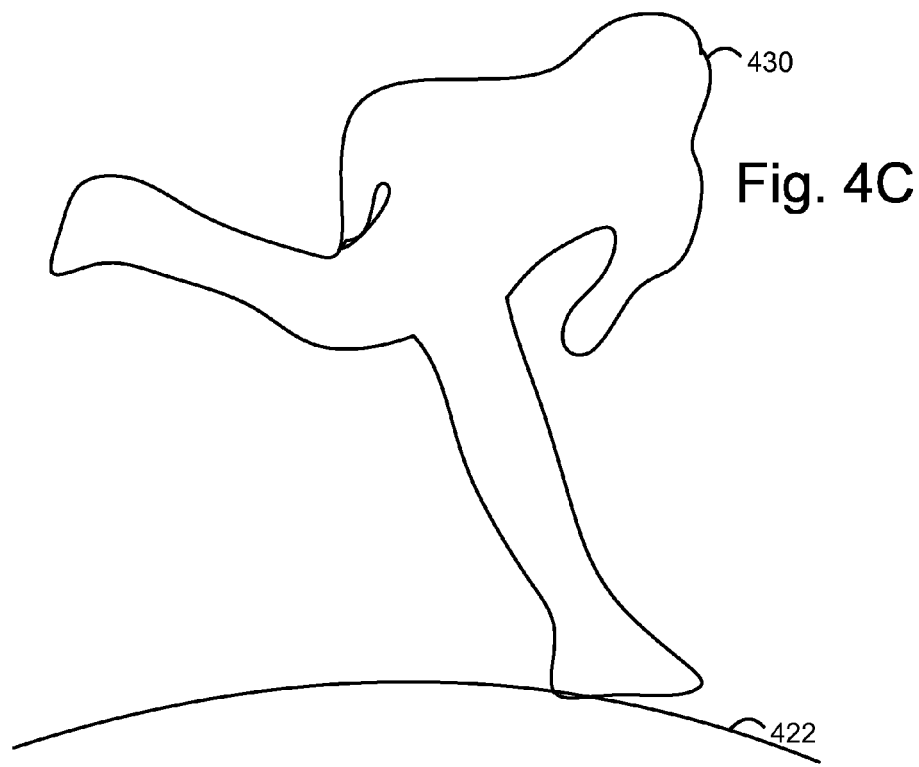
FIG. 4C depicts a video image of another bodily position of a participant which is indicative of a pitcher.

For example, FIG. 4B depicts a video image of one bodily position 420 of a participant on a pitcher's mound 422 which is indicative of a pitcher. FIG. 4C depicts a video image of another bodily position 430 of a participant on the pitcher's mound 422 which is indicative of a pitcher. In one approach, to detect a pitching motion, the video frames from a camera which is directed at the pitcher's mound can be processed and compared to previously-determined templates of pitching motions. In addition to recognizing distinctive poses in the pitching motion, the change in the pitcher's position on the field can indicate a pitch has occurred. In one approach, the system detects the pitcher first coming to rest, then his body making a distinctive move toward home plate. A similar kind of detection can be used to recognize when the pitcher throws toward one of the bases in an attempt to pick off a base runner.

Figure 5A:
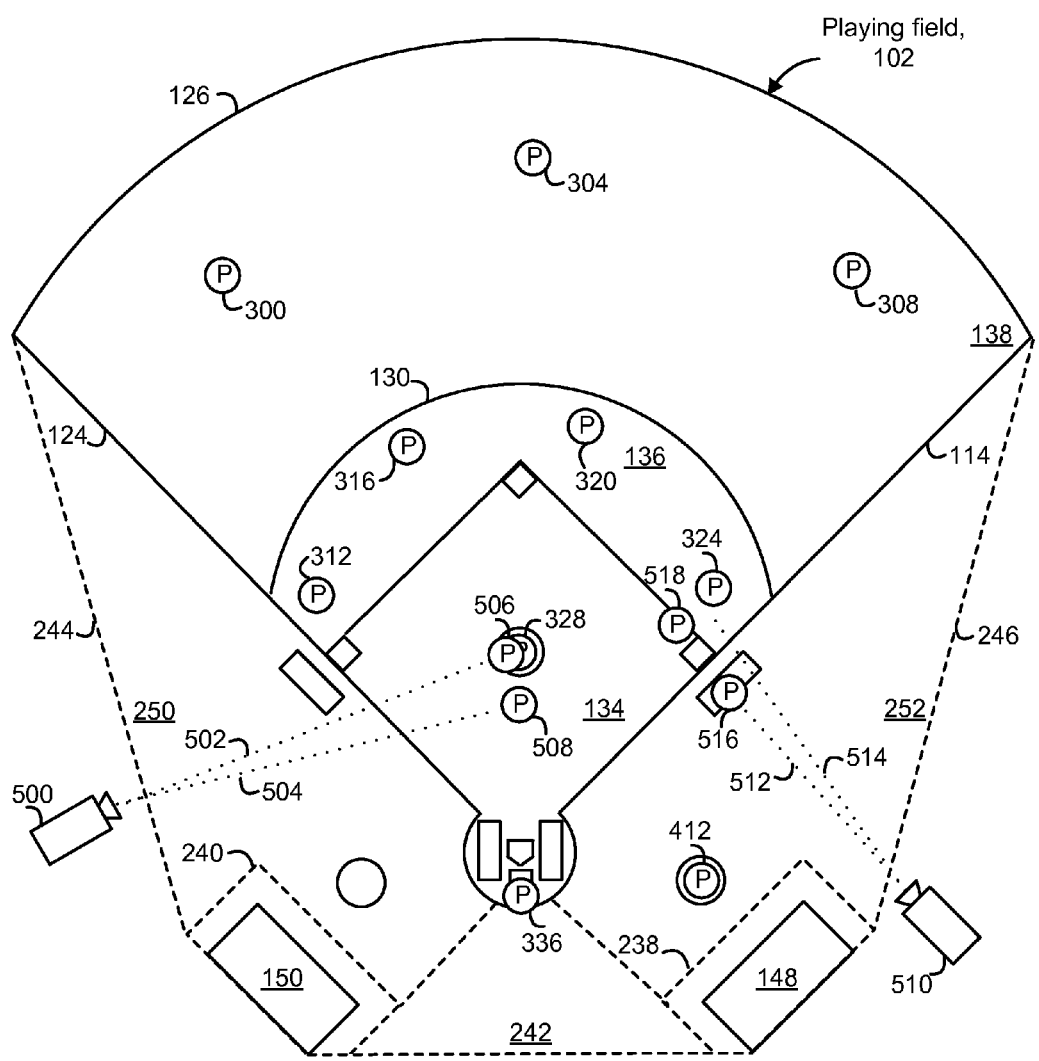
FIG. 5A depicts example locations of participants in the baseball park of FIG. 1A, indicating potential merging of participants.

FIG. 5A depicts example locations of participants in the baseball park of FIG. 1A, indicating potential merging of participants.

Two or more participants can be merged in a video frame when their images overlap, and one participant occludes another, at least in part. For example, one participant may stand in front of another participant, or move past another participant. Generally, merges can occur in image space or world space. A merge in image space may occur for a particular camera angle in which blobs which represent the participants overlap in image space, even if the two participants are not close physically. In this case, there may be another camera angle in which blobs which represent the participants do not overlap in image space. A merge in world space may occur when the participants are physically close to each other so that blobs which represent the participants overlap in image space from all camera angles.

The merged participants may not be identifiable from the video frame. For example, in a time interval of video, a non-merged interval can be defined in which there are one or more non-merged participants in the video frames, followed by a merged interval in which there are two or more merged participants in the video frames, followed by a non-merged interval in which there are one or more non-merged participants in the video frames. The merged interval can be very brief, in the range of one or more seconds, or longer, such as several seconds. If the participants are not identifiable during the merged interval, this would result in a gap in the digital record. The digital record can be used for various purposes including determining performance metrics, such as the time it takes for the player to react to a hit, or to run to the ball, or to a base, for instance. The digital record can also be used to provide a chronology of where each participant is throughout the game. The digital record can also be used to cross-reference video clips/sequences to specific participants. It is therefore desirable to provide as complete a digital record as possible.

By observing successive locations of one or more participants (e.g., at least first and second participants) before and/or after the merged interval, in the non-merged intervals, one can identify a role from among a plurality of roles in the baseball game which is consistent with the successive locations. For example, this can be a role as a participant, such as one of the nine player roles, or a role as coach, such as one of the coach's roles. Based on the identified role, digital record of the baseball game is updated to associate the role with the successive locations of the one or more participants in the merged interval. In one approach, in the merged interval, we can associate the roles of the merged participants to one track. For instance, we can say that, for a certain time segment we have a merged track which represents the merged participants, e.g., the first baseman and the runner on first base. Separating the merged participants may or may not be possible. In one approach, we attempt to split one merged blob into two or more human figures.

Splitting a blob containing multiple participants can occur temporally using template matching from one or more previous frames, and/or spatially within a single frame using blob shape and contours. In the temporal approach, we find a previous frame where the participants can be separately tracked, cut out one participant from this previous frame, and perform a correlation of the pixel intensity values from the one participant to the pixel intensity values of the blob to distinguish the one participant in the blob.

In a spatial approach, we can analyze the area of the merged blob. For example, we can detect that a blob is too big to be one participant, and can make a good guess as to whether it is two or three participant based on its area. Also, based on the shape of the contours of the blob, we can get an idea of how to split the blob. For example, if one large blob is formed by a thin connection between two larger areas, this could be two players standing close to one another (e.g., first baseman and base runner), and we know each larger area is a separate player. Also, there are specific situations where players look merged but physically they are not merged, such as when they appear to be vertically merged on the video screen, due to one player being in the foreground and one being in the background, but vertically aligned. We can determine that two participants are present due to the height of the blob being inconsistent with one player. A blob detecting technique can determine if a blob meets at least one specified criterion, such as size, aspect ratio, density or color profile. An erode filter can be used to reduce the size of a blob so that smaller features are removed, leaving one or more central masses. This can be useful, e.g., when two participants which are connected by a field line are initially identified as one blob. For instance, if the blob is too large, e.g., its height is greater than the average height of a participant by a threshold amount, e.g., 25%, an erode filter is run on the blob. This is an example of shape analysis which tries to break up a blob which is not likely to represent a single participant.

Moreover, since the video frames are obtained from multiple cameras each having different viewpoints of the baseball park, it is possible that different merged intervals are associated with different ones of the multiple cameras, or that a merged interval is associated with one of the multiple cameras, and no merged interval during the time interval is associated with another of the multiple cameras. For example, consider a scenario where the coach walks to the pitcher's mound to talk to the pitcher. Successive participant locations 506 and 508 represent the coach at successive points in time of a time interval, and participant location 328 represents the pitcher who is assumed to be essentially stationary on the pitcher's mound during the time interval. From the viewpoint or perspective of the camera 500 along the left side of the baseball park, the participants are not merged when the coach is at the participant location 508 (associated with a line of position 504), and the participants are merged when the coach is at the participant location 506 (associated with a line of position 502).

As another example, consider a scenario where the first base coach is stationary at participant position 516, while the first baseman moves from participant position 324 to participant position 518. From the viewpoint or perspective of the camera 510 along the right side of the baseball park, the participants are not merged when the first baseman is at the participant location 324 (associated with a line of position 514), and the participants are merged when the first baseman is at the participant location 518 (associated with a line of position 512). Throughout the game, from each camera viewpoint, the players' images in the video frames may be occasionally merged or separated.

Figure 5B:
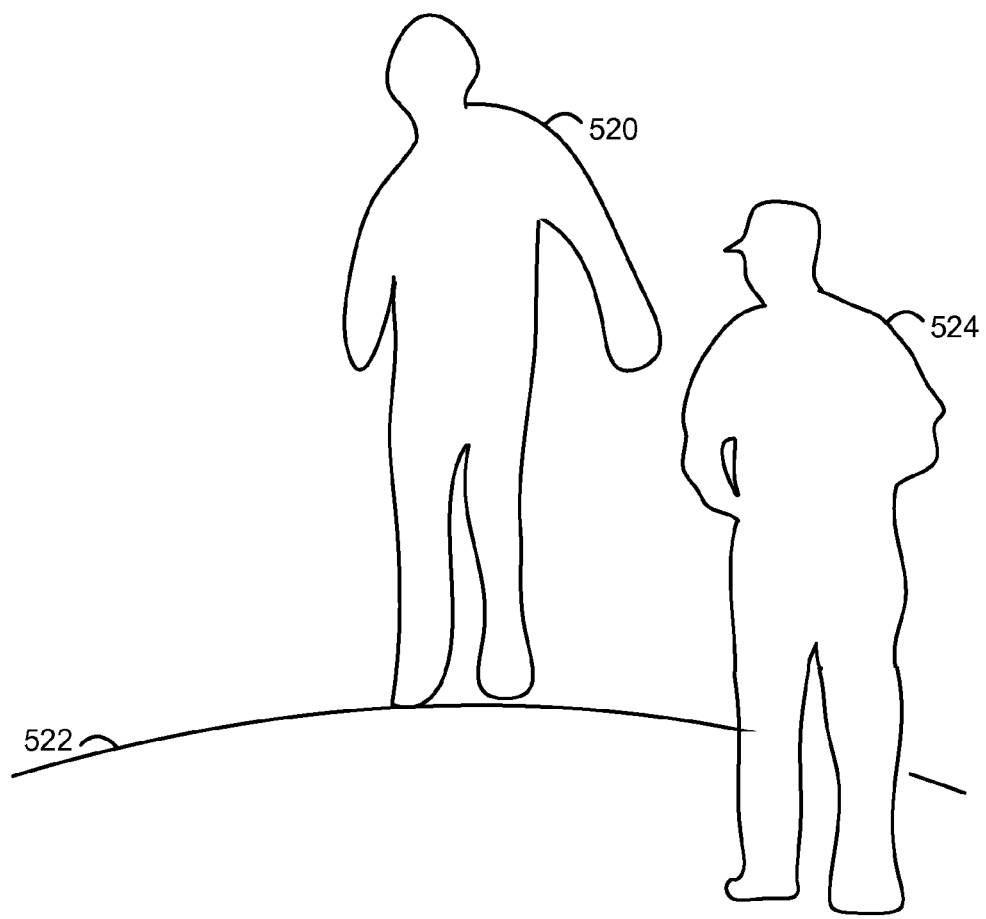
FIG. 5B depicts a video image of a pitcher and a coach who are not merged, from the viewpoint of the camera 500 of FIG. 5A.

FIG. 5B depicts a video image of a pitcher and a coach who are not merged, from the viewpoint of the camera 500 of FIG. 5A. The pitcher 520, on the pitcher's mound 522, is in the participant position 328 and the coach 524 is in the participant position 508, to the right of the pitcher.

Figure 5C:
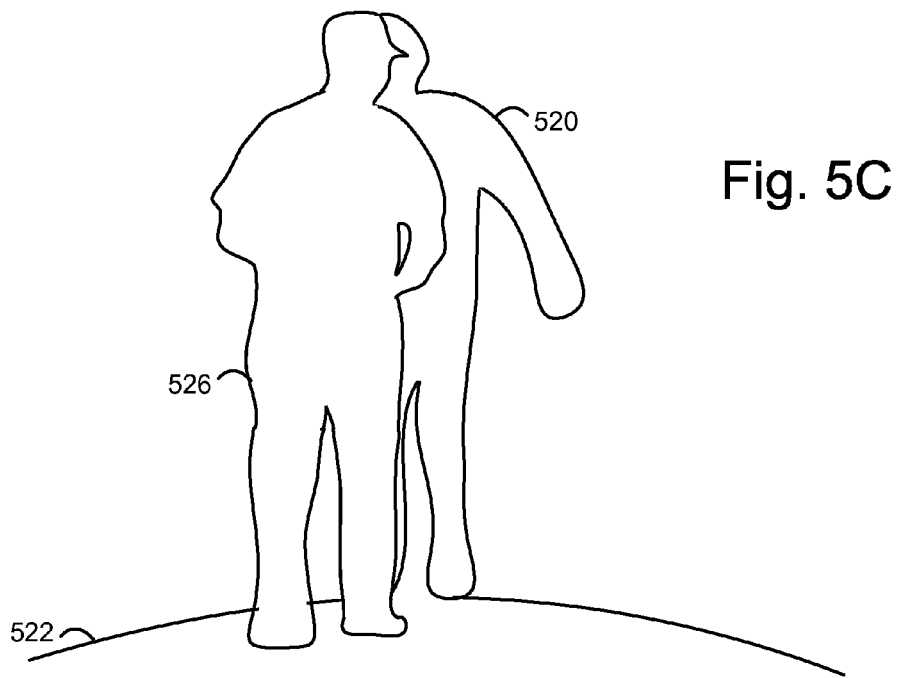
FIG. 5C depicts a video image of a pitcher and a coach who are merged, from the viewpoint of the camera 500 of FIG. 5A.

FIG. 5C depicts a video image of a pitcher and a coach who are merged, from the viewpoint of the camera 500 of FIG. 5A. The pitcher 520 is still in the participant position 328, but the coach is now in the participant position 526, in front of the pitcher. This video image represents what is seen by the video, where the human eye can discern that there are two participants present. However, when the video frames are processed using image processing techniques to detect the representation of an object, such as one or more participants, in an image, it may not be possible to distinguish the two participants.

Figure 5D:
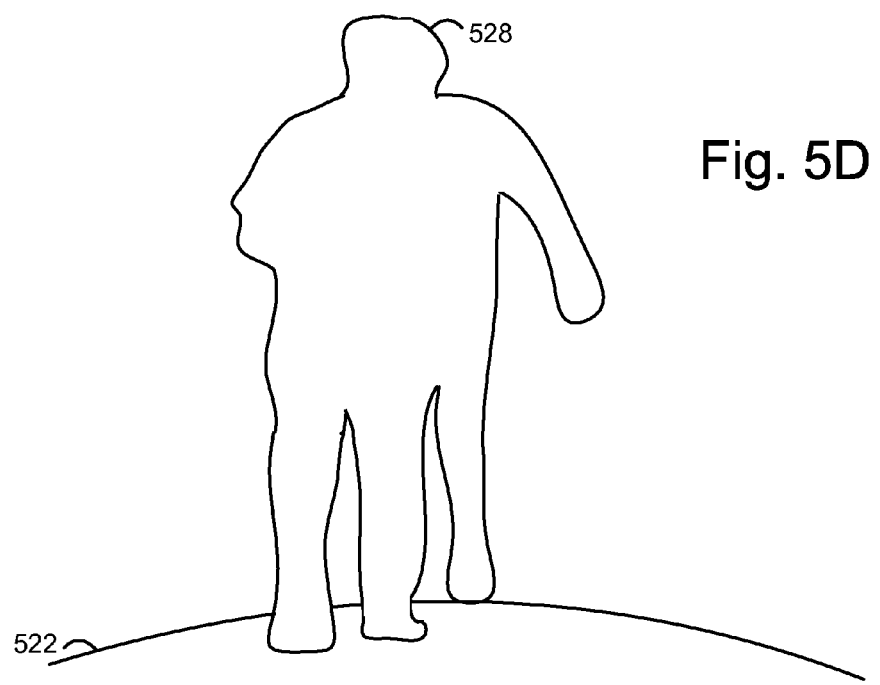
FIG. 5D depicts an outline image of the video image of FIG. 5C.

The image processing typically provides a rough outline image of the object such as depicted by the image 528. FIG. 5D depicts an outline image 528 of the video image of FIG. 5C.

FIG. 5E1 depicts a timeline of the participants in FIG. 5E2 indicating merged and non-merged time intervals, from the perspective of the camera 500 of FIG. 5A. Example time points t0-t18 are depicted, where a dark square indicates a time point at which a merge occurs and a white square indicates a time point at which a merge does not occur. Thus, t7-t10 is a merged interval in the time interval t0-t18, and t0-t6 and t11-t18 are non-merged intervals. The same timeline applies to both of the merged participants since, if one participant is merged, so is the other. The notation "tms" denotes the start of a merged interval and "tme" denotes the end of the merged interval.

FIG. 5E2 depicts a portion of the baseball park of FIG. 5A, showing tracks of a pitcher and a coach in a time interval. The same scenario as in FIG. 5A is repeated, including the participant location 328 of the pitcher and the participant locations 506 and 508 of the coach. However, additional locations of the coach are also specified for each of the nineteen time points in FIG. 5E1. In particular, at t0, the coach is in the dugout region 240 and begins walking toward the pitcher's mound region 248. A dashed line circle represents an area 549 around the pitcher's mound region. Generally, an area can be defined around landmarks such as the pitcher's mound and the bases, which can be used to resolve merge scenarios. This area can typically be larger than the regions around the landmarks which are used to determine if a participant is at the landmark.

At t6, the coach is at participant location 542, within the area 549. At t7, the coach is at participant location 544, and is merged with the pitcher. At t8, the coach is at participant location 506, and is merged with the pitcher. At t9, the coach is at participant location 548, and is merged with the pitcher. At t10, the coach is at participant location 550, and is merged with the pitcher. At t11, the coach is at participant location 508, and is no longer merged with the pitcher. The coach continues to moves back to the dugout region, where participant location 552 corresponds to the final time point (tf). A track portion 543 between participant locations 540 and 542 is a non-merged track of the coach, while a track portion 546 between participant locations 544 and 550 is a merged track (for both the coach and the pitcher) and a track portion 547 between participant locations 508 and 552 is another non-merged track of the coach. Point 554 represents the track of the pitcher, and is half black and half white to represent merged and non-merged intervals, respectively. The track portion 546 is a merged track for both the coach and the pitcher because it cannot be associated with either the coach or the pitcher without analyzing the non-merged tracks.

In this example, consider the participant who moves from the dugout region to the pitcher's mound region, and back to the dugout region, to be a first, unknown participant, and the participant who remains on the pitcher's mound to be a second, unknown participant. One can identify the role of the first participant from among a plurality of roles in the baseball game which is consistent with the successive locations of the first and second participants in one or both of the non-merged intervals. This can include determining that the first and second participants are within a specified distance of the pitcher's mound of the playing field during at least a portion of the non-merged intervals, and identifying the role for the first participant as a coach and a role for the second participant as a pitcher, if, during the non-merged interval, the first participant moves from the pitcher's mound toward a dugout while the second participant is at the pitcher's mound. That is, after the coach talks to the pitcher, the coach returns to the dugout and the pitcher remains at the pitcher's mound. Thus, the track of the coach in the non-merged interval can be used to identify both the coach and the pitcher during the merged interval.

FIG. 5E3 depicts a digital record for the locations of the pitcher in FIG. 5E2. Each entry includes one of the time points t0-t18, a corresponding location (which is a fixed location of the pitcher being on the pitcher's mound, in this example), a corresponding region of the ballpark, an indication of whether the track of the participant is merged, an indication of whether the merge has been resolved, an indication of the time intervals used to resolve the merge, and an indication of the other merged participant. By identifying merged tracks, it is possible to query the digital record to obtain corresponding video clips for study, for instance, or to manually confirm that a merge was correctly resolved. Resolving of a merge generally includes identifying the participants in the video frames in which a merge is detected. In some cases, a merge may not be resolved and this may also be of interest. For example, it is possible to query the digital record to obtain corresponding video clips of unresolved merges for study, for instance, to manually resolve a merge.

By identifying an indication of the time intervals used to resolve the merge, it is possible to query the digital record to obtain corresponding video clips for study, for instance, to manually confirm that a merge was correctly resolved. By identifying the other merged participant, it is possible to query the digital record to obtain corresponding video clips for study, for instance, to manually confirm that the other merged participant was correctly identified.

The interval t7-t10 represents a portion of the respective track of the participant which is in the merged interval, and the intervals t0-t6 and t11-t18 represents portions of the respective track of the participant which are in non-merged intervals.

FIG. 5E4 depicts a digital record for the locations of the coach in FIG. 5E2. Similar information is provided as in FIG. 5E3, but for the coach. Note that the locations of the coach, which define the track, vary as the coach moves on the playing field, in the different regions, including the dugout region 240, then the left-side out-of-bounds region 250, then the infield square or diamond 134, then the pitcher's mound region 248, then back to the infield square or diamond 134, the left-side out-of-bounds region 250, and the dugout region 240.

Note that a digital record or portion thereof may be created or updated initially without being associated with a particular participant until that participant is later identified.

Additional example merge scenarios are discussed next.

FIG. 6A depicts a video image of a first baseman 600 and a base coach 602 who are not merged, from the viewpoint of the camera 510 of FIG. 5B. The right-side foul line 114, first base 112 and the first base coach's box 140 are depicted. The first base coach 602, in the first base coach's box 140, is in the participant position 516, and the first baseman is in the participant position 324, to the right of the first base coach. The first baseman is crouching in preparation for receiving a batted ball. Here, the participants are not merged. The first base coach 602 is stationary.

Figure 6B:
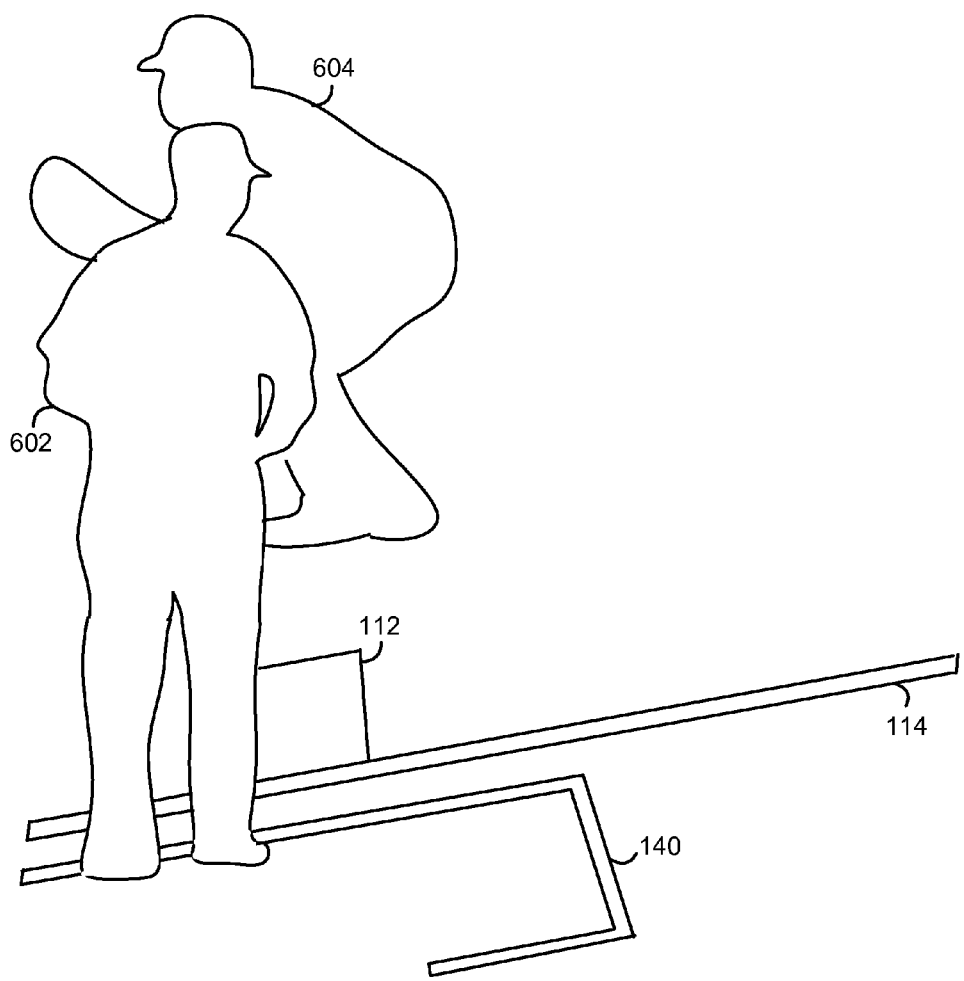
FIG. 6B depicts a video image of a first baseman and a base coach who are merged, from the viewpoint of the camera 510 of FIG. 5B.

FIG. 6B depicts a video image of a first baseman and a base coach who are merged, from the viewpoint of the camera 510 of FIG. 5B. The participants become merged as the first baseman 604 moves to the participant position 518, behind the first base coach 602.

FIG. 6C depicts an outline image 606 of the video image of FIG. 6B.

FIG. 6D1 depicts a timeline of the participants in FIG. 6D2 indicating merged and non-merged time intervals, from the perspective of the camera 510 of FIG. 5A. Example time points are t0-t7, where t2-t4 is a merged interval and t0-t1 and t5-t7 are non-merged intervals.

FIG. 6D2 depicts a portion of the baseball park of FIG. 5A, showing tracks of a first baseman and a base coach in a time interval, corresponding to the timeline of FIG. 6D1. A non-merged track 620 represents the first baseman moving from the participant location 324 to 622. A merged track 624 represents the first baseman moving to the participant locations 518, 626 and 628. The merged track 624 is associated with both the first baseman and the first base coach because it cannot be associated with either the first baseman or the first base coach without analyzing the non-merged tracks.

Another non-merged track 634 represents the first baseman moving from the participant location 630 to 632. A dashed line circle represents an area 649 around the first base region which can be used to resolve merge scenarios. Point 516 represents the track of the first base coach, and is half black and half white to represent that merged and non-merged intervals, respectively, occur.

FIG. 6D3 depicts a digital record for the first base coach in FIG. 6D2. Each entry includes one of the time points t0-t6, a corresponding location (which is a fixed location of the first base coach), a corresponding region of the ballpark (the first base coach's area 214), an indication of whether the track of the participant is merged, an indication of whether the merge has been resolved, an indication of the time intervals used to resolve the merge, and an indication of the other merged participant (the first baseman, or "1st bsmn").

FIG. 6D4 depicts a digital record for the first baseman in FIG. 6D2. The locations of the first baseman, which define the track, vary as the first baseman moves on the playing field, in the different regions, including the first baseman's region 212, then the first base region 218, and back to the first baseman's region 212. The other merged participant is identified as the first base coach, or "1st bs co").

Figure 7A:
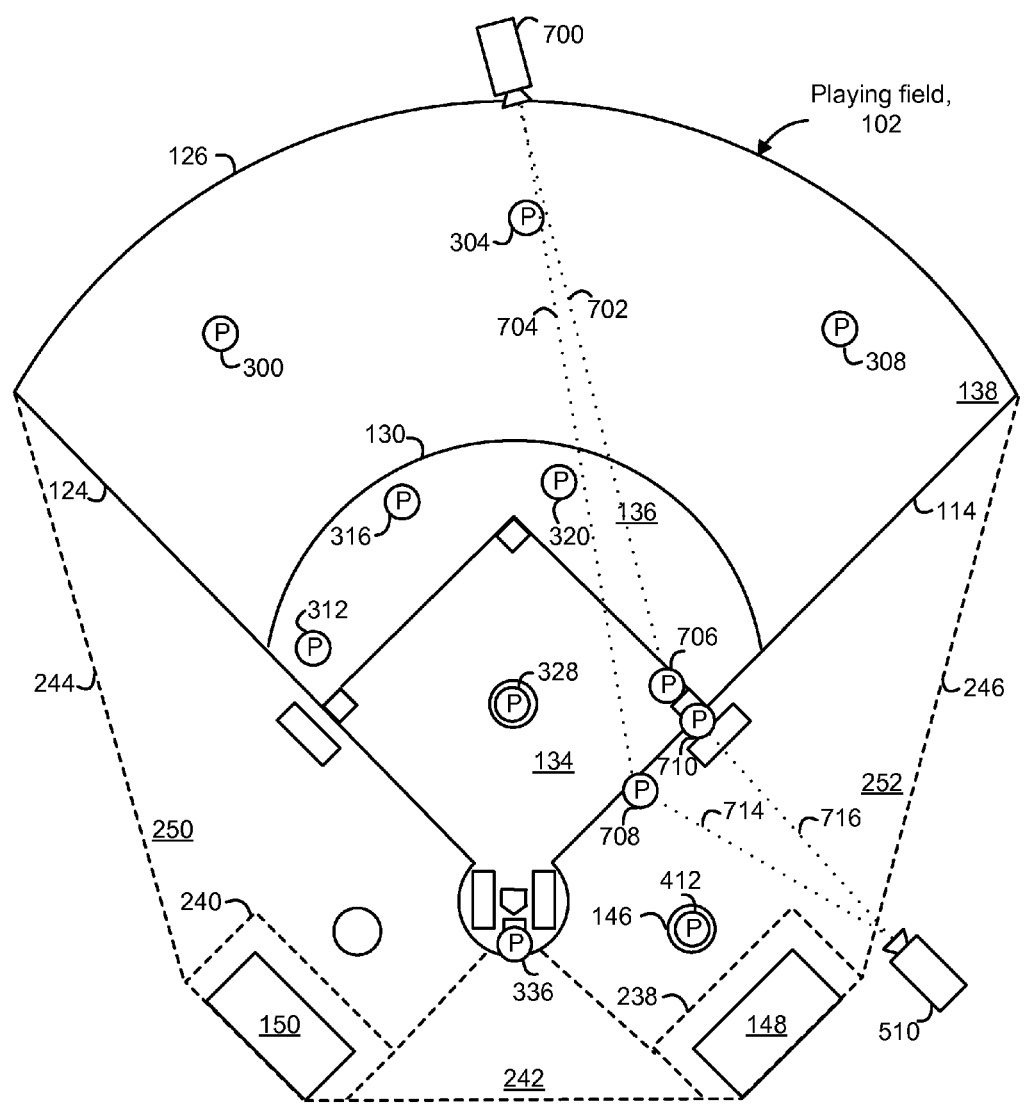
FIG. 7A depicts further example locations of participants in the baseball park of FIG. 1A, indicating potential merging of participants.

FIG. 7A depicts further example locations of participants in the baseball park of FIG. 1A, indicating potential merging of participants. As mentioned, the detection of merged participants in a video frame depends on the viewpoint of the camera. In this scenario, a base runner is running to first base. Participant locations 708 and 710 depict the base runner, and participant location 706 depicts the first baseman, who is assumed to be stationary in the time interval under analysis. For example, the first baseman may be in position to catch the ball from another fielder. At the participant location 708, camera 510 has line of position 714 while a camera 700 located at the edge of center field includes a line of position 704. At the participant location 710, camera 510 has line of position 716 while the camera 700 has a line of position 702. Generally, from the viewpoint of the camera 500, the first baseman will be occluded by, and merged with, the base runner, when the base runner is at first base. From the viewpoint of the camera 700, the base runner will be occluded by, and merged with, the first baseman, when the base runner is approaching first base.

FIG. 7B1 depicts a timeline of the participants in FIG. 7B2 indicating merged and non-merged time intervals, from the perspective of the camera 510 of FIG. 7A. Example time points are t0-t18, where t6-t7 is a merged interval and t0-t5 and t8-t18 are non-merged intervals.

FIG. 7B2 depicts a portion of the baseball park of FIG. 7A, showing tracks of a first baseman and a first base runner in a time interval, corresponding to the timeline of FIG. 7B1. A non-merged track 736 represents the first baseman moving from the participant location 324 to 738. A merged track 744 represents the first baseman moving to the participant locations 740 and 706. The merged track 744 is associated with both the first baseman and the base runner because it cannot be associated with either the first baseman or the base runner without analyzing the non-merged tracks. Another non-merged track 746 represents the first baseman moving to the participant location 742. Similarly, a non-merged track 724 represents the base runner moving from the participant location 720 to 722, 708 and 726. A merged track 745 represents the base runner moving to the participant locations 710 and 728. The merged track 745 is associated with both the first baseman and the base runner because it cannot be associated with either the first baseman or the base runner without analyzing the non-merged tracks. Another non-merged track 732 represents the base runner moving from the participant location 730 to 734. This track could continue to the dugout region 238, for instance, such as when the base runner is called out at first, and returns to the dugout region.

FIG. 7B3 depicts a digital record for the first baseman in FIG. 7B2, from the perspective of camera 510. Each entry includes one of the time points t0418, a corresponding location, a corresponding region of the ballpark (a first baseman's region 212 from t0-t4, and first base region 218 from t5-t18), an indication of whether the track of the participant is merged, an indication of whether the merge has been resolved, an indication of the time intervals used to resolve the merge, and an indication of the other merged participant (the base runner or "bs rnr").

FIG. 7B4 depicts a digital record for the first base runner in FIG. 7B2, from the perspective of camera 510. The entries indicate the corresponding region of the ballpark (a first base runner's region 216 from t0-t8 and a right-side out-of-bounds region 252 from t9-t18), and an indication of the other merged participant (the first baseman or "1st bs man").

FIG. 7C1 depicts a timeline of the participants in FIG. 7C2 indicating merged and non-merged time intervals, from the perspective of the camera 700 of FIG. 7A. A difference from FIG. 7B1 is that the merged interval is t4-t6 instead of t6-t7 due to the different viewpoint of the camera 700 compared to the camera 510. Also, t0-t3 and t7-t18 are non-merged intervals.

FIG. 7C2 depicts a portion of the baseball park of FIG. 7A, showing tracks of a first baseman and a runner headed to first base in a time interval, corresponding to the timeline of FIG. 7C1. A non-merged track 748 represents the first baseman moving from the participant location 324 to 740. A merged track 750 represents the first baseman at the participant location 706. The merged track 750 is associated with both the first baseman and the base runner because it cannot be associated with either the first baseman or the base runner without analyzing the non-merged tracks. Another non-merged track 747 represents the first baseman at the participant location 742. Similarly, a non-merged track 754 represents the base runner moving from the participant location 720 to 722. A merged track 756 represents the base runner at the participant locations 708, 726 and 710. The merged track 756 is associated with both the first baseman and the base runner because it cannot be associated with either the first baseman or the base runner without analyzing the non-merged tracks. Another non-merged track 752 represents the base runner moving from the participant location 728 to 734.

FIG. 7C3 depicts a digital record for the first baseman in FIG. 7C2, from the perspective of camera 700. Each entry is the same as in FIG. 7B3 except for the identification of the merged and non-merged intervals.

FIG. 7C4 depicts a digital record for the first base runner in FIG. 7C2, from the perspective of camera 700. Each entry is the same as in FIG. 7B4 except for the identification of the merged and non-merged intervals.

Figure 8A:
FIG. 8A depicts a video image of a first baseman and a base runner who are not merged, from the viewpoint of the camera 700 of FIG. 7A.

FIG. 8A depicts a video image of a first baseman and a base runner who are not merged, from the viewpoint of the camera 700 of FIG. 7A. The first baseman 800, touching the base 112 with his foot, is in the participant position 706, and the base runner 802 is in the participant position 708, to the right of the first baseman. The first baseman is in a position to catch a ball to force the base runner out. Here, the participants are not merged.

Figure 8B:
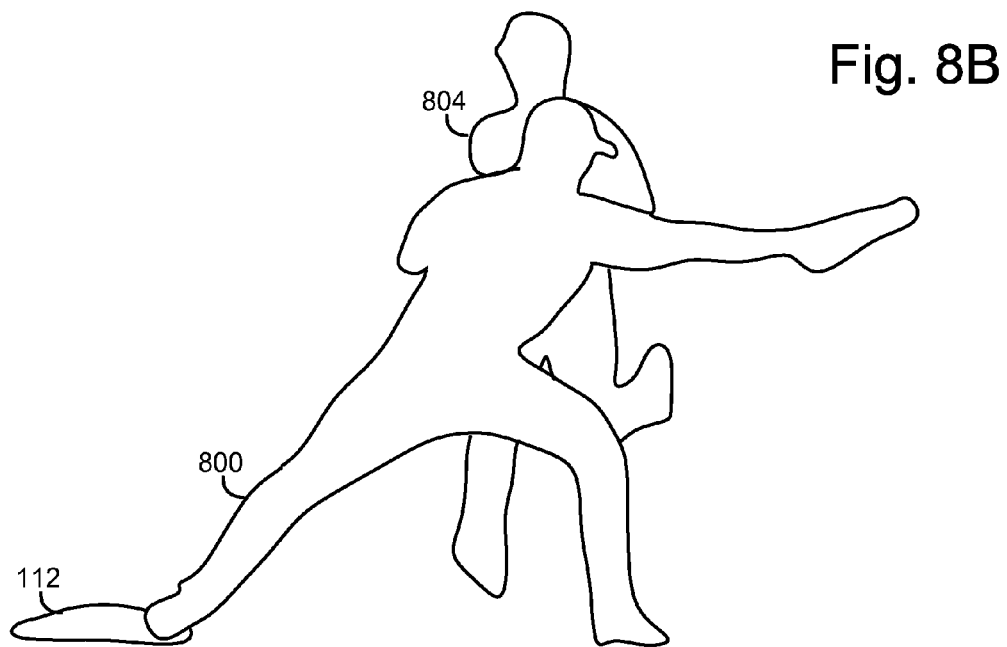
FIG. 8B depicts a video image of a first baseman and a runner headed to first base who are merged, from the viewpoint of the camera 700 of FIG. 7A.

FIG. 8B depicts a video image of a first baseman and a base runner who are merged, from the viewpoint of the camera 700 of FIG. 7A. The participants become merged as the base runner 804 moves to the participant position 710, behind the first baseman 800.

Figure 8C:
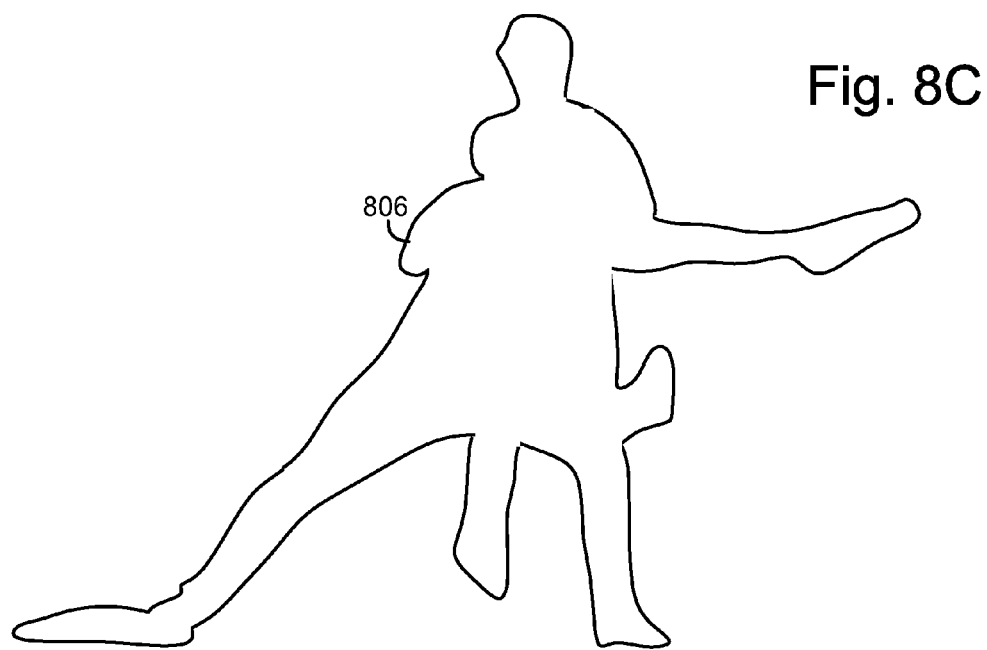
FIG. 8C depicts an outline image of the video image of FIG. 8B.

FIG. 8C depicts an outline image 806 of the video image of FIG. 8B.

Similar images (not shown) can be obtained to represent the merged and non-merged intervals from the viewpoint of the camera 510.

Figure 9A:
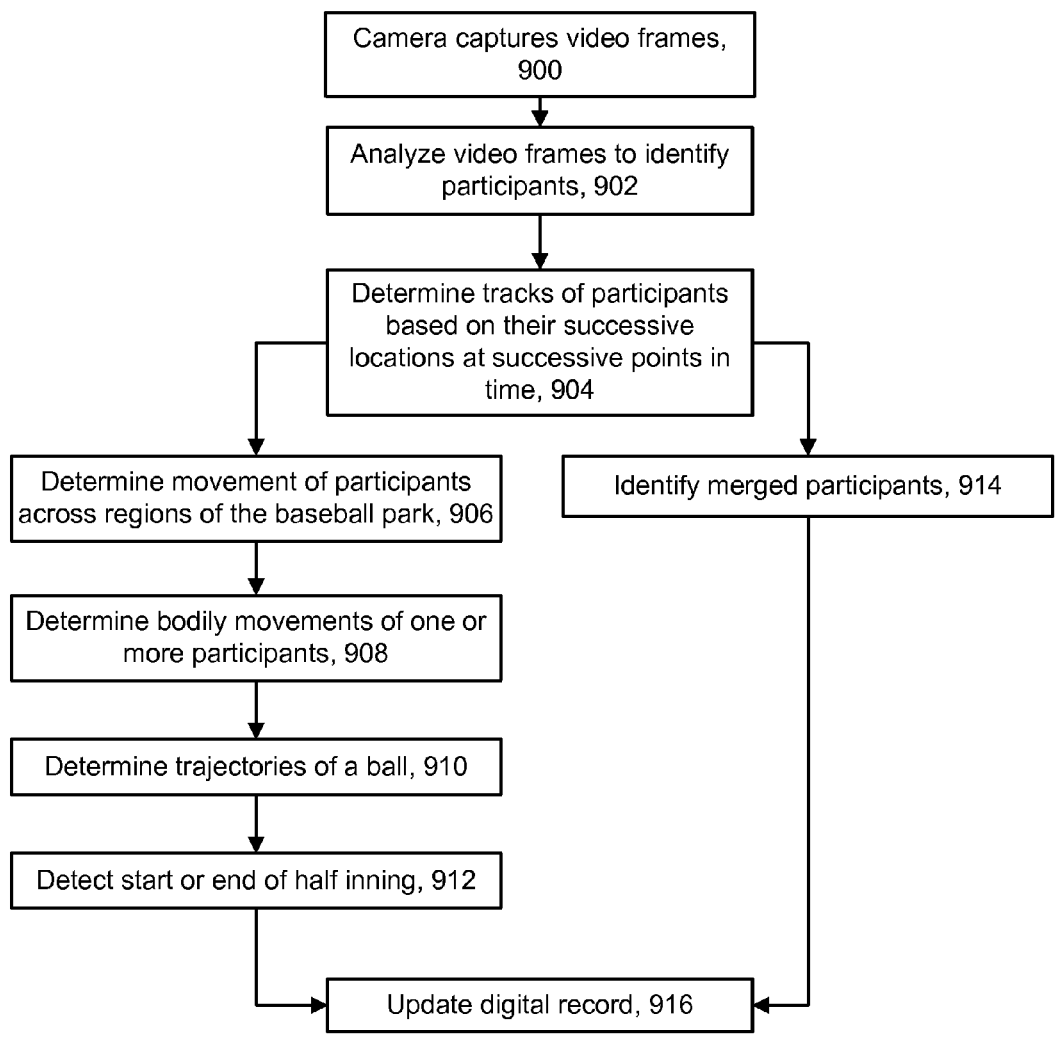
FIG. 9A depicts an example method for tracking baseball participants from a video sequence, and updating a digital record.

FIG. 9A depicts an example method for tracking baseball participants from a video sequence, and updating a digital record. At step 900, one or more cameras capture video frames. Step 902 analyzes the video frames to identify participants, such as by using image processing techniques. One example approach uses pattern recognition and morphological processing. Pattern recognition techniques include edge detection, which involves detecting edges of objects in an image. The edges can be detected based on contrasts in pixel data which extend generally vertically or horizontally in an image or otherwise along a specific direction. Edge detection can be performed using luminance and/or chrominance pixel data from an image. The chrominance pixel data can encompass any desired color space, including monochrome, RGB, YUV and HSV, among others, for instance. These edges may represent physical features of the object, such as the outline of a human.

The video images can be processed by analyzing the pixel data in each image. This processing can occur in real time as each image is received, or later on such as after the game. Real time processing can include, e.g., processing that occurs during a video broadcast of a live event. After edges are detected, morphological processing can be used to form an image of the one or more participants. The image data of the edges is represented as a binary image, in which each pixel is restricted to a value of either 0 or 1. Each pixel in the background is displayed as white, while each pixel in the object is displayed as black. Binary images can be formed, e.g., by thresholding a grayscale image such that pixels with a value greater than a threshold are set to 1, while pixels with a value below the threshold are set to 0. The image data can be processed using two basic morphological operations, namely dilation and erosion. Further, one could repeat this process for different color components of the object. It is not necessary for each pixel to be restricted to a value of 0 or 1, or that it even be monochrome in nature.

With erosion, every object pixel that is touching a background pixel is changed into a background pixel. With dilation, every background pixel that is touching an object pixel is changed into an object pixel. Erosion makes an object smaller, and can break a single object into multiple objects. Dilation makes an object larger, and can merge multiple objects into one. Opening is defined as an erosion followed by a dilation. Closing is the opposite operation and is defined as a dilation followed by an erosion. Opening tends to removes small islands and thin filaments of object pixels, while closing tends to removes islands and thin filaments of background pixels.

Another possible technique, a blob detecting, determines if a detected object meets at least one specified criterion, such as size, aspect ratio, density or color profile. In some cases, an erode filter is used to reduce the size of a blob so that smaller features are removed, leaving one or more central masses. This can be useful, e.g., when two players which are connected by a field line are initially identified as one blob. For instance, if the blob is too large, e.g., its height is greater than the average height of a player by a threshold amount, e.g., 25%, an erode filter is run on the blob. This is an example of shape analysis which tries to break up a blob which is not likely to represent a single player. In some scenarios, the participants are still merged after such processing, in which case other techniques (step 914) can be used.

The motion of the participants can be modeled, e.g. using Kalman tracking, to follow each participant from frame to frame, and to handle collisions (merging and splitting) by using the participants' velocities to associate the track before and after an overlap. We can adjust the Kalman tracking based on knowledge of how the game proceeds. Some of the player's tracks can be marked as being merged tracks, unmerged tracks or uncertain tracks. After the merged participants clearly separate into two (or more) tracks, if we do not know which track is for which participant, we can label those two new tracks as "uncertain." For example, we might say that we have two tracks and we are uncertain which one is for the left fielder and which one is for the center fielder. Thus, an uncertain track can be a type of unmerged track.

Step 902 can also automatically identify each participant based on where they are standing. This identification can be independent of the identification of merged participants. For example, participants can be identified based on their location in a particular region of the field. For example, a participant in the first baseman's region 212 (FIG. 2A) can be identified as the first baseman. Moreover, this identification can be made at specified points in the game, such, such as when a pitch is thrown.

Step 904 determines tracks of the participants based on their successive locations at successive points in time. Once a participant is identified in a video frame, by identifying pixels in the video frames which correspond to a human figure, the location of the participant in the baseball park can be determined, e.g., using principles discussed in connection with FIG. 1C. Sensor and registration data of the one or more cameras can be used. Since the orientation and position of the camera with respect to the playing field is known, and the playing field can be modeled as a flat surface, a set of pixels in a frame which corresponds to a human figure can be associated with a location on the playing field.

Steps 906-912 relate to determining the start or end of a half-inning, while step 914 relates to identifying merged participants. Step 906 determines movements of participants in across regions of the baseball park, such as using the regions of FIG. 2B, and as discussed in connection with FIGS. 3A-3B3. For example, this can indicate movement of the players between the playing field and the dugout. Step 908 includes determining bodily movements of one or more participants. For example, a pitcher can be identified by observing a pitching motion, as discussed in connection with FIGS. 4A-4C. Step 910 includes determining trajectories of a ball. For example, this can include identifying fielders warming up by playing catch, as discussed in connection with FIG. 4A. Step 912 includes detecting the start or end of a half-inning based on one or more of the previous steps. In one approach, a probability that a half-inning has started or ended can be associated with each step, and a final decision can be made by comparing a combined probability (which combines the probability of each step) to a threshold. In another approach, a final decision can be made based on one step or criterion. Step 916 includes updating one or more digital records based on the previous steps.

Further details of steps 906, 908, 910 and 914 are provided next.

Figure 9B:
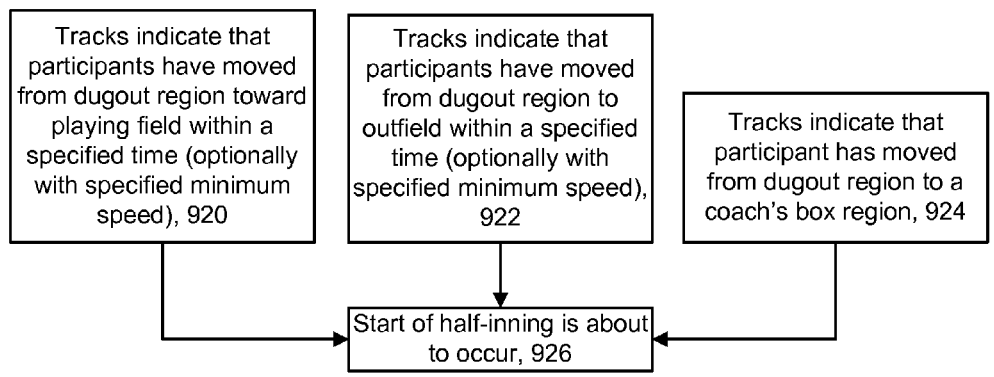
FIG. 9B depicts an example of further details of step 906 of FIG. 9A, for use in determining the start of a half-inning in step 912 of FIG. 9A.

FIG. 9B depicts an example of further details of step 906 of FIG. 9A, for use in determining the start of a half-inning in step 912 of FIG. 9A. At step 920, the tracks of the participants indicate that the participants have moved from the dugout region toward the playing field within a specified time. Optionally, one or more of the participants has a specified minimum speed. At step 922, the tracks of the participants indicate that the participants have moved from the dugout region to the outfield within a specified time. Optionally, one or more of the participants has a specified minimum speed. At step 924, the tracks of the participants indicate that a participant has moved from the dugout region to a coach's box region. Step 926 determines that the start of a half-inning is about to occur based on one or more of the previous steps.

Figure 9C:
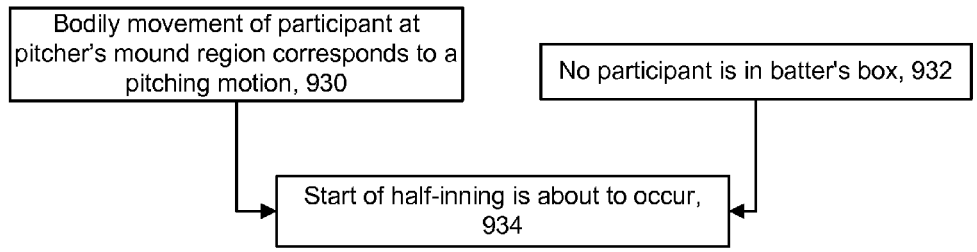
FIG. 9C depicts an example of further details of step 908 of FIG. 9A, for use in determining the start of a half-inning in step 912 of FIG. 9A.

FIG. 9C depicts an example of further details of step 908 of FIG. 9A, for use in determining the start of a half-inning in step 912 of FIG. 9A. Step 930 determines that a bodily movement of a participant at a pitcher's mound region corresponds to a pitching motion. Step 932 determines that, at the same time, no participant is in the batter's box. Step 934 determines that the start of a half-inning is about to occur based on one or more of the previous steps.

Figure 9D:
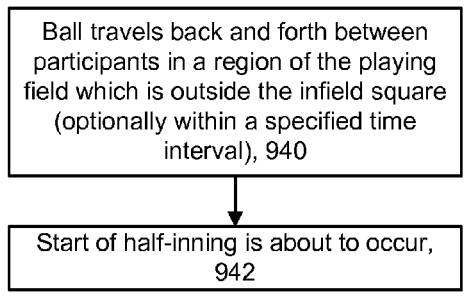
FIG. 9D depicts an example of further details of step 910 of FIG. 9A, for use in determining the start of a half-inning in step 912 of FIG. 9A.

FIG. 9D depicts an example of further details of step 910 of FIG. 9A, for use in determining the start of a half-inning in step 912 of FIG. 9A. Step 940 determines that the baseball travels back and forth between participants in a region of the playing field which is outside of the infield square. Optionally, this occurs within a specified time interval. Step 942 determines that the start of a half-inning is about to occur based on the previous step.

Figure 9E:
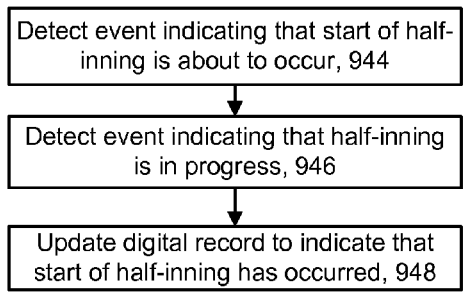
FIG. 9E depicts an example of a process for determining the start of a half-inning.

FIG. 9E depicts an example of a process for determining the start of a half-inning Step 944 detects one or more events which indicate that the start of a half-inning is about to occur, such as based on steps 920, 922, 924, 930, 932, 940 and 942. Step 946 detects one or more events which indicate that the half-inning is in progress, such as the first pitch with the batter in the batter's box, or any other event which typically occurs during a half-inning and not during the time between half-innings Step 948 updates a digital record to indicate that the start of the half-inning has occurred. It is also possible to update the digital record to indicate that the events of step 944 and/or 946 have occurred, including identifying the time and description of the event.

Figure 9F:
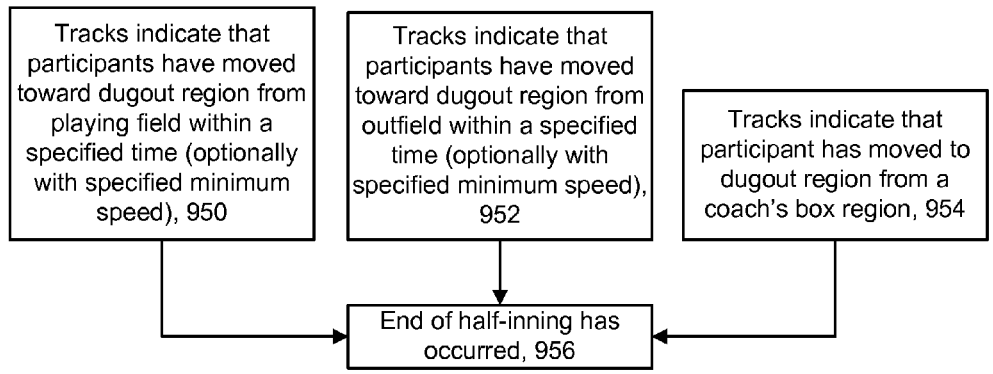
FIG. 9F depicts an example of further details of step 906 of FIG. 9A, for use in determining the end of a half-inning in step 912 of FIG. 9A.

FIG. 9F depicts an example of further details of step 906 of FIG. 9A, for use in determining the end of a half-inning in step 912 of FIG. 9A. At step 950, the tracks of the participants indicate that the participants have moved toward the dugout region from the playing field within a specified time. Optionally, one or more of the participants has a specified minimum speed. At step 952, the tracks of the participants indicate that the participants have moved toward the dugout region from the outfield within a specified time. Optionally, one or more of the participants has a specified minimum speed. At step 954, the tracks of the participants indicate that a participant has moved to the dugout region from a coach's box region. Step 956 determines that the end of a half-inning has occurred based on one or more of the previous steps.

Figure 9G:
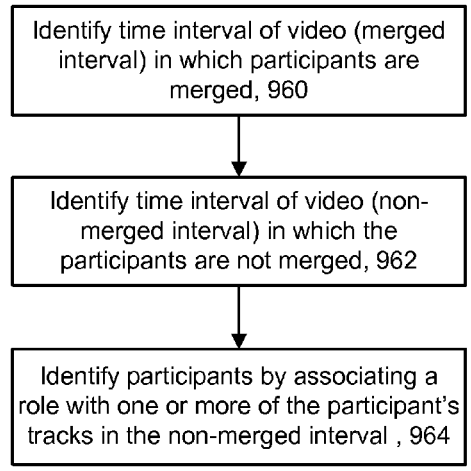
FIG. 9G depicts an example of further details of step 914 of FIG. 9A, for use in detecting merged participants.

FIG. 9G depicts an example of further details of step 914 of FIG. 9A, for use in detecting merged participants. Step 960 identifies a time interval of a video sequence (e.g., a merged interval) in which participants are merged. Step 962 identifies a time interval of the video sequence in which (e.g., a non-merged interval) in which the participants are not merged. Typically, the merged and non-merged intervals are adjacent, although this is not required. Step 964 identifies the participants by associating a role with one or more of the participant tracks in the non-merged interval. This can involve a number of different scenarios.

For example, with first and second merged participants, the identifying of the participants can include determining that the first and second participants are within a specified distance of a base of the playing field (e.g., within the circle 649 in FIG. 6D2, where the base is first base) during at least a portion of the non-merged interval, and identifying the role for the first participant as a base coach of the base, if, during the non-merged interval, the first participant is in a coach's box region associated with the base.

In another possible approach, the identifying of the participants can include determining that the first and second participants are within a specified distance of a base of the playing field (e.g., within the circle 649 in FIG. 6D2, where the base is first base) during at least a portion of the non-merged interval, and identifying the role for the first participant as a fielder assigned to the base (e.g., the first baseman) and a role for the second participant as a base runner to the base, if, during the non-merged interval, the first participant is at a fielder's location (e.g., the first baseman's region 212) associated with the base or at the base itself, and the second participant is at the base or running away from the base, such as to the next base.

This can occur when the base runner is safe at the base and remains in the base region. For first base, the base runner is allowed to overrun the base and return to it if not called out. A longer time period can be set for determining if the base runner remains in the base region, compared to second and third base, where the base runner can be tagged out if he overruns the base.

In another possible approach, the identifying of the participants can include determining that the first and second participants are within a specified distance of a base of the playing field (e.g., within the circle 649 in FIG. 6D2, where the base is first base) during at least a portion of the non-merged interval, and identifying the role for the first participant as a fielder assigned to the base (e.g., the first baseman) and a role for the second participant as a base runner to the base, if, during the non-merged interval, the first participant is at a fielder's location (e.g., the first baseman's region 212) associated with the base while the second participant runs along a path to the base (e.g., the first base runner's region 216). Example base running paths are discussed in connection with FIG. 9H.

Figure 9H:
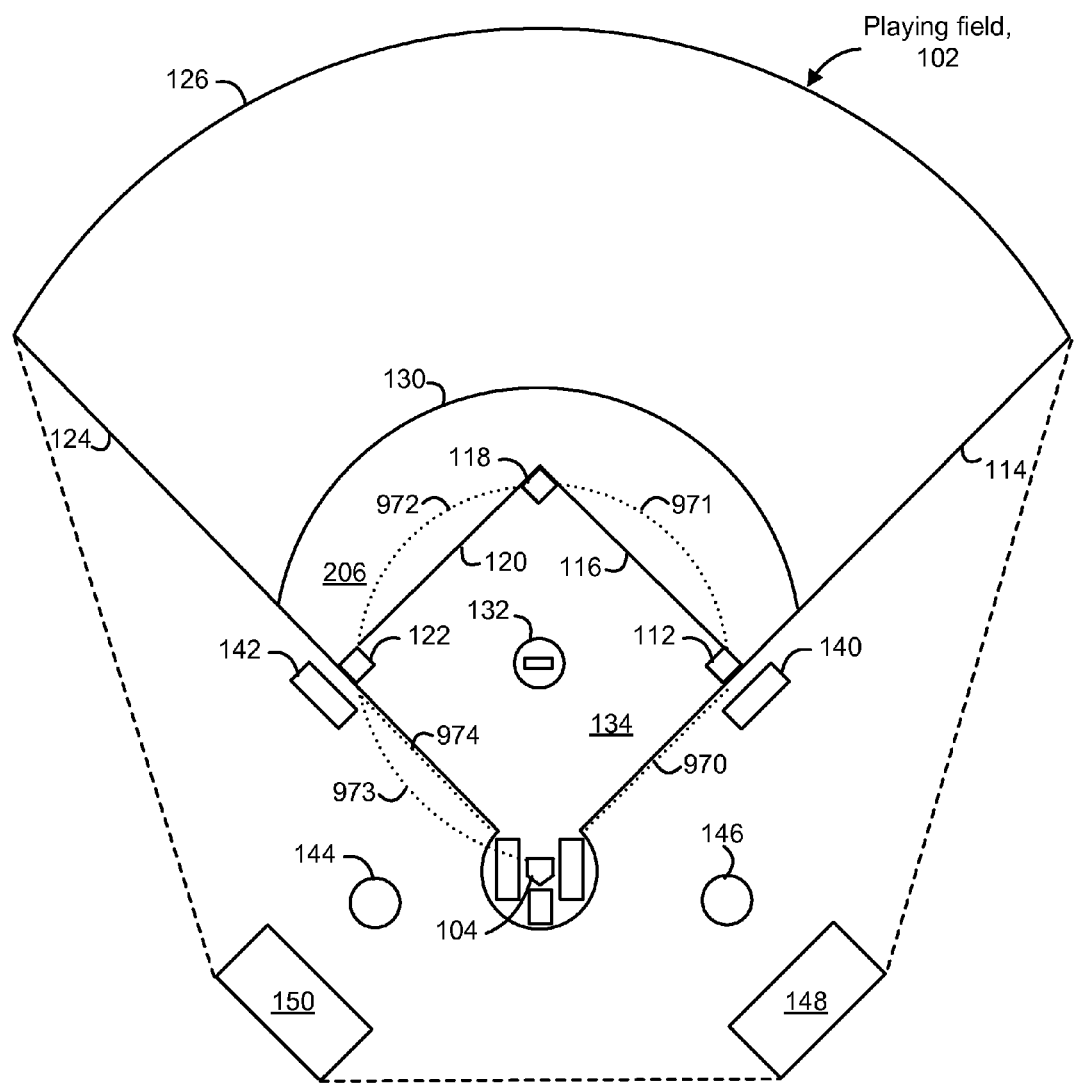
FIG. 9H depicts the baseball park of FIG. 1A including straight and curved base running paths.

FIG. 9H depicts the baseball park of FIG. 1A including straight and curved base running paths. The path to first base, for instance (path 970), is along the foul line region, in the first base runner's region 216 (FIG. 2A). Respective base running paths from first to second base (116 or 971), from second base to third base (120 or 972), and from third base to home plate (974 or 973) can similarly be defined. Further, a relatively straight path (970, 116, 120 and 974) can be defined between bases where the base runner starts at one base and runs to the next base (either stopping at the next base or continuing on to a further base), and a relatively curved path (971, 972 and 973) can be defined between bases where the base runner runs to one base, stepping on that base, then continues to the next base. An example of a straight path (970) occurs when a player is at bat and runs to first base after hitting a pitch, either stopping at first base or continuing on. Another example of a straight path (116) occurs when a player is on first base at the start of a play and then runs to second base when the player at bat hits a pitch, or when the player at first base attempts to steal second base. Similar examples of straight paths apply between second and third base (path 120) and between third base and home plate (path 974). An example of a curved path occurs when a player at bat hits a pitch, runs to first base, rounds first base and continues to second base (path 971). Similar examples of curved paths apply when the player starts at first and runs past second base, rounds second base, to third base or home plate, or starts at second base, runs to third base, rounds third base, and continues to home plate.

Referring still to FIG. 9G, in another possible approach, the identifying of the participants can include determining that the first and second participants are within a specified distance of a base of the playing field (e.g., within the circle 649 in FIG. 6D2, where the base is first base) during at least a portion of the non-merged interval, and identifying the role for the first participant as a fielder assigned to the base (e.g., the first baseman) and a role for the second participant as a base runner to the base, if, during the non-merged interval, the first participant is at a fielder's location associated with the base and the second participant moves from a region of the base (e.g., region 218 where the base is first base) to a dugout region of the baseball park (e.g., via track 732 in FIG. 7B2). This can occur, e.g., when the base runner is called out at the base and returns to the dugout.

In another possible approach, the identifying of the participants can include identifying the role for the first participant as a fielder assigned to one fielding position and a role for the second participant as a fielder assigned to another fielding position, if, during the non-merged interval, the first participant is at a location associated with the one fielding position and the second participant is at a location associated with the another fielding position. This can occur, e.g., when the left fielder and center fielder move close together to catch a ball which is hit between them then return to their usual locations after the play.

In another possible approach, the identifying of the participants can include determining that the first and second participants are within a specified distance of a pitcher's mound (e.g., within the circle 549 in FIG. 5E2) of the playing field during at least a portion of the non-merged interval, and identifying the role for the first participant as a coach and a role for the second participant as a pitcher, if, during the non-merged interval, the first participant moves from the pitcher's mound toward a dugout while the second participant is at the pitcher's mound. This can occur, e.g., when the coach talks to the pitcher, the returns to the dugout.

Other scenarios are possible as well which use knowledge of the rules and customs of baseball to associate a participant's track with a particular role in the game, to identify the participant and potentially, one or more other participants.

The foregoing detailed description has been presented for purposes of illustration and description. It is not intended to be exhaustive or limited to the precise form disclosed. Many modifications and variations are possible in light of the above teaching. The described embodiments were chosen in order to best explain the principles of the technology and its practical application, to thereby enable others skilled in the art to best utilize the technology in various embodiments and with various modifications as are suited to the particular use contemplated. It is intended that the scope of the technology be defined by the claims appended hereto.

What is claimed is:

1. A method for tracking participants in a baseball game at a baseball park, comprising:
   analyzing video frames obtained from one or more cameras, the video frames provide images of participants in the baseball park and the baseball park comprises a playing field;
   based on the analyzing, determining tracks which indicates successive locations of the participants in the baseball park at successive points in time;
   associating a first probability that an end of a half-inning has occurred based on at least one of the tracks;
   associating a second probability that the end of a half-inning has occurred based on at least one other of the tracks;
   combining the first and second probabilities to provide a combined probability;
   determining that the combined probability exceeds a threshold;

in response to the determining that the combined probability exceeds the threshold, updating a digital record of the baseball game to identify the end of the half-inning; and using the digital record to cross-reference to a video segment of the baseball game; wherein:

the baseball park comprises, separate from the playing field, a dugout region for one team and a dugout region for another team;

the at least one of the tracks indicates that at least an integer number N1>2 of the participants move to the dugout region for the one team from the playing field, where the first probability is higher when the integer number N1 is greater; and the at least one other of the tracks indicates that at least an integer number N2>2 of the participants move from the dugout region for the another team to respective fielding locations in the playing field, where the second probability is higher when the integer number N2 is greater.

2. The method of claim 1, wherein:
the at least one other of the tracks indicates that one of the participants moves from a coach's box region of the baseball park to the dugout region for the another team.

3. The method of claim 1, wherein:
the at least one of the tracks indicates that the at least the integer number N1>2 of the participants move to the dugout region for the one team from the playing field within a specified time interval.

4. The method of claim 1, further comprising:
detecting an amount of time the at least the integer number N2>2 of the participants remain at the respective fielding locations, where the second probability is proportional to the amount of time.

5. An apparatus for tracking participants in a baseball game at a baseball park, comprising:

one or more cameras which provide video frames, the video frames provide images of participants in the baseball park and the baseball park comprises a playing field; and a processor, the processor analyzes the video frames to:
determine tracks which indicates successive locations of the participants in the baseball park at successive points in time;

associate a first probability that an end of a half-inning has occurred based on at least one of the tracks;

associate a second probability that the end of a half-inning has occurred based on at least one other of the tracks;

combine the first and second probabilities to provide a combined probability;

determine that the combined probability exceeds a threshold; and in response to the combined probability exceeding the threshold, update a digital record of the baseball game to identify the end of the half-inning; and the processor uses the digital record to cross-reference to a video segment of the baseball game; wherein:

the baseball park comprises, separate from the playing field, a dugout region for one team and a dugout region for another team;

the at least one of the tracks indicates that at least an integer number N>2 of the participants move to the dugout region for the one team from the playing field, where the first probability is higher when the integer number N is greater; and the at least one other of the tracks indicates that one of the participants moves from a coach's box region of the baseball park to the dugout region for the another team.

6. The apparatus of claim 5, wherein:
the at least one of the tracks indicates that the at least the integer number N>2 of the participants move to the dugout region for the one team from the playing field within a specified time interval.

7. The apparatus of claim 5, wherein:
the at least one other of the tracks indicates that at least an integer number N2>2 of the participants move from the dugout region for the another team to respective fielding locations in the playing field, where the second probability is higher when the integer number N2 is greater.

8. The apparatus of claim 7, wherein:
the processor detects an amount of time the at least the integer number N2>2 of the participants remain at the respective fielding locations; and the second probability is proportional to the amount of time.

9. A method for tracking participants in a baseball game at a baseball park, comprising:

analyzing video frames obtained from one or more cameras, the video frames provide images of participants in a baseball park, the baseball park comprises a playing field and, separate from the playing field, a dugout region for one team and a dugout region for another team;

based on the analyzing: determining movement of at least one participant across regions of the baseball park, determining a bodily movement of at least one other participant, and determining a trajectory of a ball;

associating, with the movement of the at least one participant across the regions of the baseball park, a first probability that an end of a half-inning has occurred;

associating, with the bodily movement of the at least one other participant, a second probability that the end of the half-inning has occurred;

associating, with the trajectory of the ball, a third probability that the end of a half-inning has occurred;

combining the first, second and third probabilities to provide a combined probability;

determining that the combined probability exceeds a threshold;

in response to the determining that the combined probability exceeds the threshold, updating a digital record of the baseball game to identify the end of the half-inning; and using the digital record to cross-reference to a video segment of the baseball game; wherein:

the movement of the at least one participant across the regions of the baseball park comprises a movement of at least an integer number N>2 of the participants to the dugout region for the one team from the playing field, where the first probability is higher when the integer number N is greater.

10. The method of claim 9, wherein:
the movement of the at least one participant across the regions of the baseball park comprises a movement of the at least one participant between the playing field and the dugout region for the one team.

11. The method of claim 9, wherein:
the movement of the at least one participant across the regions of the baseball park comprises a movement of a participant from the dugout region for the one team to a coach's box region of the baseball park; and the first probability is proportional to an amount of time that the one of the participants remains at the coach's box region.

12. The method of claim 9, wherein:
the bodily movement comprises a pitching motion of a pitcher.

13. The method of claim 9, wherein:
the trajectory of the ball identifies fielders warming up by playing catch.

14. The method of claim 1, wherein:
the at least one of the tracks indicates that the at least the integer number N1>2 of the participants move to the dugout region for the one team from the playing field with a specified minimum speed.

15. The apparatus of claim 5, wherein:
the at least one of the tracks indicates that the at least the integer number N>2 of the participants move to the dugout region for the one team from the playing field with a specified minimum speed.

16. A method for tracking participants in a baseball game at a baseball park, comprising:
analyzing video frames obtained from one or more cameras, the video frames provide images of participants in the baseball park and the baseball park comprises a playing field;
based on the analyzing, determining tracks which indicates successive locations of the participants in the baseball park at successive points in time;
associating a first probability that an end of a half-inning has occurred based on at least one of the tracks;

associating a second probability that the end of a half-inning has occurred based on at least one other of the tracks;
combining the first and second probabilities to provide a combined probability;
determining that the combined probability exceeds a threshold;
in response to the determining that the combined probability exceeds the threshold, updating a digital record of the baseball game to identify the end of the half-inning; and
using the digital record to cross-reference to a video segment of the baseball game; wherein:
the baseball park comprises, separate from the playing field, a dugout region for one team and a dugout region for another team;
the at least one of the tracks indicates that at least an integer number N>2 of the participants move to the dugout region for the one team from the playing field, where the first probability is higher when the integer number N is greater; and
the at least one other of the tracks indicates that one of the participants moves to a coach's box region of the baseball park from the dugout region for the one team.

17. The method of claim 16, further comprising:
detecting an amount of time the one of the participants remains at the coach's box region, wherein the second probability is proportional to the amount of time.

* * * * *